US012641698B1

(12) United States Patent
Williams, Jr. et al.

(10) Patent No.: US 12,641,698 B1
(45) Date of Patent: May 26, 2026

(54) TACTICAL LIGHT WITH AUTOMATED LIGHTING CONTROLS AND SYSTEMS INCLUDING THE SAME

(71) Applicant: Teronus, Inc., Kernersville, NC (US)

(72) Inventors: Norman Franklin Williams, Jr., Kernersville, NC (US); Pandalene Marie Williams, Kernersville, NC (US)

(73) Assignee: Teronus, Inc., Kernersville, NC (US)

( * ) Notice: Subject to any disclaimer, the term of this patent is extended or adjusted under 35 U.S.C. 154(b) by 0 days.

(21) Appl. No.: 19/311,728

(22) Filed: Aug. 27, 2025

Related U.S. Application Data

(63) Continuation of application No. 19/310,138, filed on Aug. 26, 2025.

(60) Provisional application No. 63/764,050, filed on Feb. 27, 2025.

(51) Int. Cl.
| | |
|---|---|
| *H05B 47/115* | (2020.01) |
| *F41G 1/35* | (2006.01) |
| *G01C 9/06* | (2006.01) |
| *H05B 47/155* | (2020.01) |

(52) U.S. Cl.
CPC ............. *H05B 47/115* (2020.01); *F41G 1/35* (2013.01); *G01C 9/06* (2013.01); *H05B 47/155* (2020.01); *G01C 2009/066* (2013.01)

(58) Field of Classification Search
CPC ....... H05B 47/115; H05B 47/155; F41G 1/35; G01C 9/06; G01C 2009/066
See application file for complete search history.

(56) References Cited

U.S. PATENT DOCUMENTS

| | | | | |
|---|---|---|---|---|
| 4,627,183 | A | * 12/1986 | Stuckman | ................. F41G 1/35 |
| | | | | 42/114 |
| 6,094,829 | A | 8/2000 | Koestler, III | |
| 8,147,089 | B2 | 4/2012 | Matthews et al. | |
| 8,459,822 | B1 | 6/2013 | Lambert et al. | |
| 8,894,231 | B2 * | 11/2014 | Kwok | ................... A61B 5/1116 |
| | | | | 362/108 |
| 9,057,585 | B1 * | 6/2015 | Veldman | ................... F41G 1/35 |
| 9,062,933 | B1 | 6/2015 | Allen et al. | |
| 10,801,814 | B2 | 10/2020 | Ma et al. | |
| 11,320,244 | B2 | 5/2022 | Verjovsky et al. | |
| 11,828,569 | B2 | 11/2023 | Reed et al. | |

(Continued)

FOREIGN PATENT DOCUMENTS

WO 2017106801 A1 6/2017

*Primary Examiner* — Evan P Dzierzynski
(74) *Attorney, Agent, or Firm* — Womble Bond Dickinson (US) LLP

(57) ABSTRACT

A light includes a housing, a first illumination assembly, a second illumination assembly, and a control unit. The housing defines a central axis. The first illumination assembly, the second illumination assembly, and the control unit are disposed within the housing. The first illumination assembly and the second illumination assembly each have an on state in which a light beam is emitted and an off state. The control unit is configured to detect a first pitch and a second pitch of the central axis with respect to a direction of the force of gravity. The control unit is in signal communication with the first illumination assembly and the second illumination assembly such that in the first pitch the first illumination assembly is in the on state and in the second pitch the second illumination assembly is in the on the state.

19 Claims, 15 Drawing Sheets

(56)                  References Cited

U.S. PATENT DOCUMENTS

| | | | |
|---|---|---|---|
| 2010/0164401 A1* | 7/2010 | Matthews | F41G 1/35 |
| | | | 362/110 |
| 2010/0176732 A1* | 7/2010 | Schenk | H05B 47/155 |
| | | | 315/312 |
| 2014/0168952 A1* | 6/2014 | Young | F21V 7/04 |
| | | | 362/110 |
| 2020/0072432 A1* | 3/2020 | Spencer | B60Q 1/143 |
| 2020/0240750 A1* | 7/2020 | Reed | F41G 1/35 |
| 2025/0012547 A1 | 1/2025 | Ehrlich et al. | |

* cited by examiner

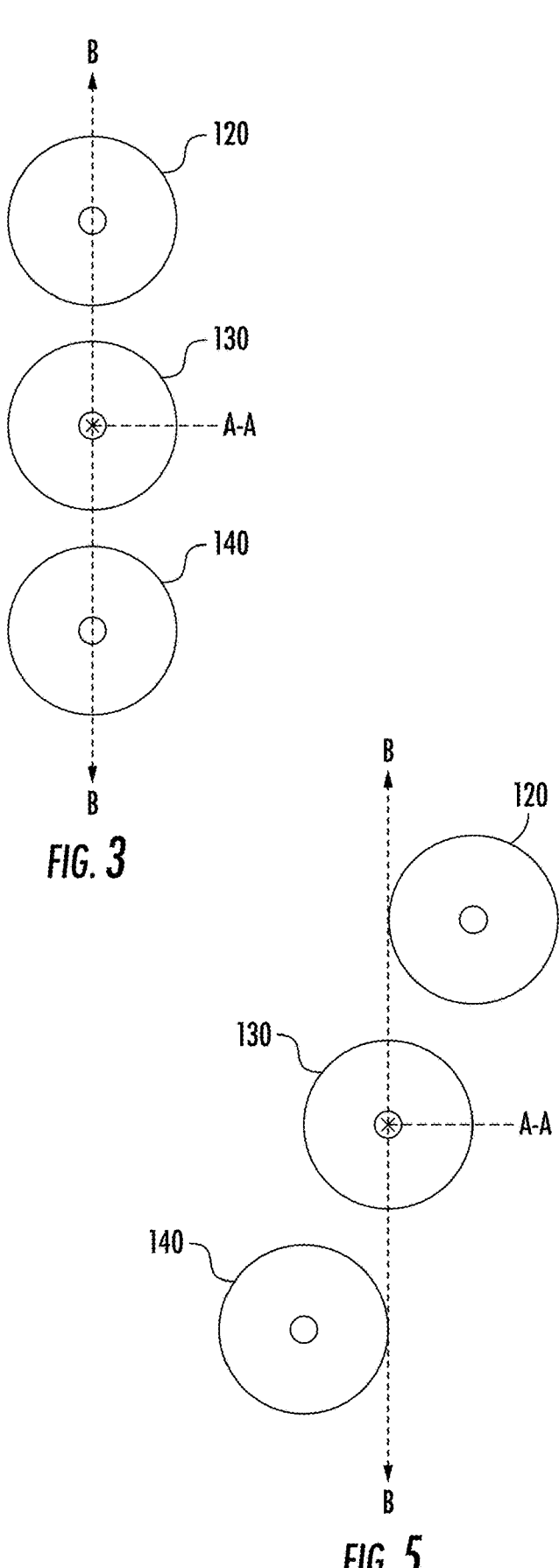
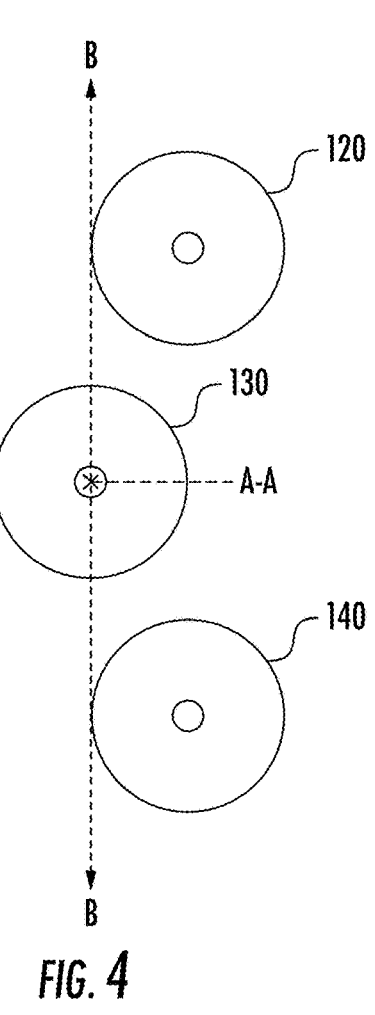
FIG. 3
FIG. 4
FIG. 5

ADDITIONAL ASSEMBLIES

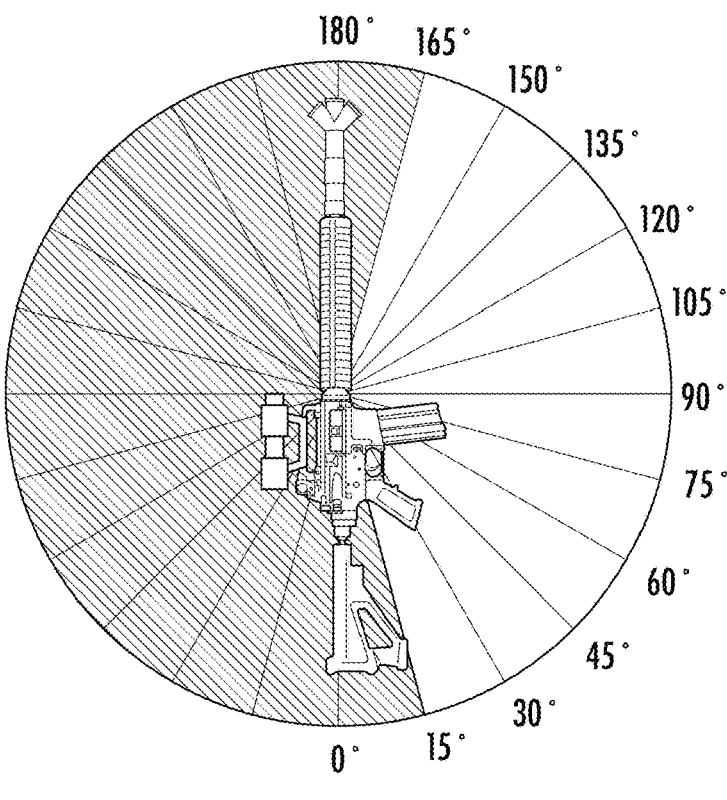
FIG. *19*
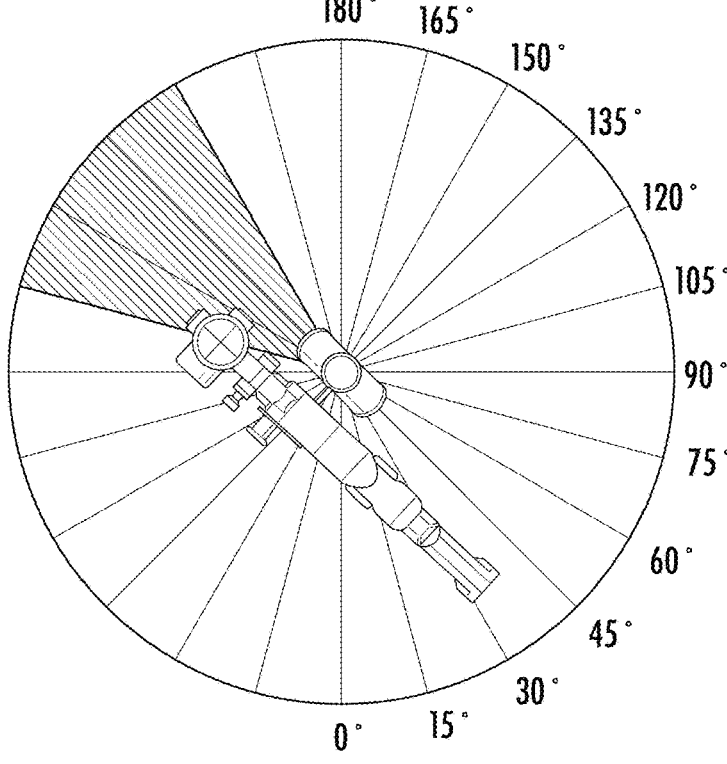
FIG. *20*

TACTICAL LIGHT WITH AUTOMATED LIGHTING CONTROLS AND SYSTEMS INCLUDING THE SAME

CROSS-REFERENCE TO RELATED APPLICATION

This application claims priority to, and the benefit of, U.S. Provisional Patent Application Ser. No. 63/764,050, filed Feb. 27, 2025, the entire contents of which are hereby incorporated by reference.

BACKGROUND

1. Technical Field

The present disclosure relates to tactical lights and, more specifically, to tactical lights with automated lighting controls and systems including the same.

2. Discussion of Related Art

Often, operators mount lights to firearms to illuminate the field of fire in low-light conditions. Current firearm illumination technologies generally involve affixing a conventional flashlight to the firearm. This simplistic setup presents several significant challenges. Firstly, in low-light conditions, utilizing such a set up necessitates aiming a loaded firearm toward areas or individuals not yet identified as threats. If an operator encounters a non-threatening individual, such as a family member, law enforcement officer, or civilian, this may pose a safety risk or may lead to legal repercussions for endangering others.

Additionally, the need to manually operate additional switches or controls for the light can detract from the ability of the operator to safely manage the safety mechanisms and trigger of the firearm. In high-stress situations, this added complexity can lead to confusion and compromise the safety of both the operator and others in the vicinity. Furthermore, the light source can serve as a target for genuine threats, potentially directing hostile fire towards the operator. For example, when in use, current firearm lights are typically held along the centerline of the operator which allows a threat to target the head or center of mass of the operator from cover, without a light of their own to give away position.

There is a continuing need for improved tactical lights for standalone use or for use as a firearm mounted light.

SUMMARY

The proposed innovation may automate control of an illumination device and allow a user to concentrate on target acquisition or to concentrate on operation of the firearm. The proposed disclosure may mitigate risk by diverting initial return fire away from critical areas such as a user's head and torso. Diverting initial return fire may enhance a user's safety during engagements.

This disclosure relates generally to a tactical light and a tactical light for mounting to a firearm that is controlled based on the position of the light. The tactical light disclosed herein may allow an operator to illuminate a field of view with a firearm in a target engagement posture and illuminate a field of view for the operator when the operator holds the firearm in a high ready posture or a low ready posture without the firearm directed towards a potential target. The disclosed tactical light may switch modes based on the position of the tactical light or firearm automatically to allow an operator to concentrate on operation of the firearm. The disclosed tactical light may divert return fire away from critical areas of an operator's head or torso and thus, increase safety of an operator during an engagement. The disclosed tactical light may decrease the risk to an unintended target in the case of an unintentional discharge.

In an aspect of the present disclosure, a light includes a housing, a first illumination assembly, a second illumination assembly, and a control unit. The housing defines a central axis. The first illumination assembly is disposed within the housing. The first illumination assembly has an on state in which the first illumination assembly emits a light beam and an off state. The first illumination assembly defines a first center illumination axis that is parallel with the central axis of the housing. The second illumination assembly is disposed within the housing. The second illumination assembly has an on state in which the second illumination assembly emits a light beam and an off state. The second illumination assembly defines a second center illumination axis that is offset from the central axis of the housing. The control unit is disposed within the housing. The control unit is configured to detect a first pitch of the central axis with respect to a direction of the force of gravity and to detect a second pitch of the central axis with respect to the direction of the force of gravity. The control unit is in signal communication with the first illumination assembly such that in the first pitch the first illumination assembly is in the on state. The control unit is in signal communication with the second illumination assembly such that in the second pitch the second illumination assembly is in the on state.

In aspects, the first illumination assembly is configured to illuminate a visual field of an operator in the first pitch and the second illumination assembly is configured to illuminate the visual field of the operator in the second pitch.

In some aspects, the housing may include a third illumination assembly having an on state in which the third illumination assembly emits a light beam and an off state. The third illumination assembly may define a third center illumination axis that is offset from the central axis of the housing. The first illumination assembly, the second illumination assembly, and the third illumination assembly may be disposed within the housing such that the first center illumination axis, the second center illumination axis, and the third center illumination axis may be coplanar.

In some aspects, the control unit includes a sensor. The sensor may include an inclinometer configured to detect a pitch of the central axis of the housing with respect to the direction of the force of gravity. The sensor may include an accelerometer configured to detect movement of the central axis.

In certain aspects, the control unit is configured to detect radial movement of the light about the central axis. The control unit may be in signal communication with the first illumination assembly and the second illumination assembly such that when the control unit detects that the light is rolled a first direction about the central axis the first illumination assembly and the second illumination assembly are in the on state. The control unit may be in signal communication with the first assembly and the second illumination assembly such that when the control unit detects the light is rolled a second direction, opposite the first direction, about the central axis first illumination assembly and the second illumination assembly are in a strobe state in which the first illumination assembly and the second illumination assembly emit a flashing light.

In particular aspects, when the light is at the first pitch the first illumination assembly may be in the on state and the second illumination assembly may be in the off state. When the light is at the second pitch the first illumination assembly may be in the off state and the second illumination assembly may be in the on state. When the light is at the first pitch the first illumination assembly may be in the on state and the second illumination assembly may be in the on state. The light beam emitted by the first illumination assembly may have a different brightness than the light beam emitted by the second illumination assembly.

In aspects, the control unit is configured to alter properties of the light beam emitted from the first illumination assembly or the second illumination assembly in response to movement of the housing. The properties of the light beam may include beam brightness, beam angle, beam color, or combinations thereof.

In some embodiments, the first pitch may be in a range of 60 degrees to 120 degrees. The second pitch may be in a range of 120 degrees to 165 degrees or in a range between 15 degrees to 60 degrees.

In another aspect of the present disclosure, a weapons system includes a weapons platform defining an aiming axis and light mounted to the weapons platform. The light includes a first illumination assembly, a second illumination assembly, and a control unit. The first illumination assembly has an on state in which the first illumination assembly emits a light beam and an off state. The first illumination assembly defines a first center illumination axis that is parallel to the aiming axis of the weapons platform. The second illumination assembly has an on state in which the second illumination assembly emits a light beam and an off state. The second illumination assembly defines a second center illumination axis that is angled with respect to the aiming axis of the weapons platform. The control unit is configured to detect a position of the light that corresponds to a posture of the weapons system with respect to a direction of the force of gravity. The control unit is in signal communication with the first illumination assembly such that when the aiming axis is at a first pitch with respect to the direction of the force of gravity the weapons system is in a target engagement posture and the first illumination assembly is in the on state. The control unit is in signal communication with the second illumination assembly such that when the aiming axis is at a second pitch with respect to the direction of the force of gravity the weapons system is in a high ready posture or a low ready posture and the second illumination assembly is in the on state.

In aspects, the light is configured to illuminate a visual field of an operator of the weapons platform in each posture. The light may include a third illumination assembly having an on state in which the third illumination assembly emits a light beam and an off state. The third illumination assembly may define a third center illumination axis that is angled with respect to the aiming axis of the weapons platform. The control unit may be in signal communication with the third illumination assembly such that when the aim axis is at a third pitch with respect to the direction of the force of gravity the weapons system may be in the other of the high ready posture or the low ready posture and the third illumination assembly may be in the on state. The control unit may be configured to detect radial movement of the weapons system about the aiming axis. The control unit may be in signal communication with the first illumination assembly, the second illumination assembly, and the third illumination assembly such that when the control unit detects that the weapons system is rolled a first direction about the aiming axis the first illumination assembly, the second illumination assembly, and the third illumination assembly may be in the on state. The control unit may be in signal communication with the first illumination assembly, the second illumination assembly, and the third illumination assembly such that when the control unit detects that the weapons system is rolled a second direction, opposite the first direction, about the aiming axis of the first illumination assembly, the second illumination assembly, and the third illumination assembly may be in a strobe state in which the first illumination assembly, the second illumination assembly, and the third illumination assembly emit a flashing light. The light may be configured to incapacitate target when in the strobe state.

In some aspects, the first pitch is in a range of 60 degrees to 120 degrees. The second pitch may be in a range of 120 degrees to 165 degrees. The third pitch may be in a range of 15 degrees to 60 degrees. The weapons system may have a vertical posture in which the aiming axis of the weapons platform may be substantially parallel to the direction of the force of gravity. When the weapons system is in the vertical posture the first illumination assembly, the second illumination assembly, and the third illumination assembly may be in the off state. The weapons platform may include a remote selector in signal communication with the light to switch the first illumination assembly and the second illumination assembly between the on state and the off state regardless of the posture of the weapons system.

In another aspect of the present disclosure, a method of controlling a light includes detecting a first position of the light. The method also includes switching a first illumination assembly to an on state thereof. The method also includes detecting a second position of the light. The method also includes switching a second illumination assembly to an on state thereof.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein:

FIG. 3 is a front view of the illumination assemblies of FIG. 2;

FIG. 4 is a front view of illumination assemblies of another light in accordance with embodiments of the present disclosure;

FIG. 5 is a front view of illumination assemblies of another light in accordance with embodiments of the present disclosure;

FIG. 19 is a schematic illustration depicting a range of motion of a vertical posture of the weapons system of FIG. 12;

FIG. 20 is a schematic illustration of a rear view of the weapons system of FIG. 12 depicting a range of motion of a side posture of the weapons system;

DETAILED DESCRIPTION

Figure 1:
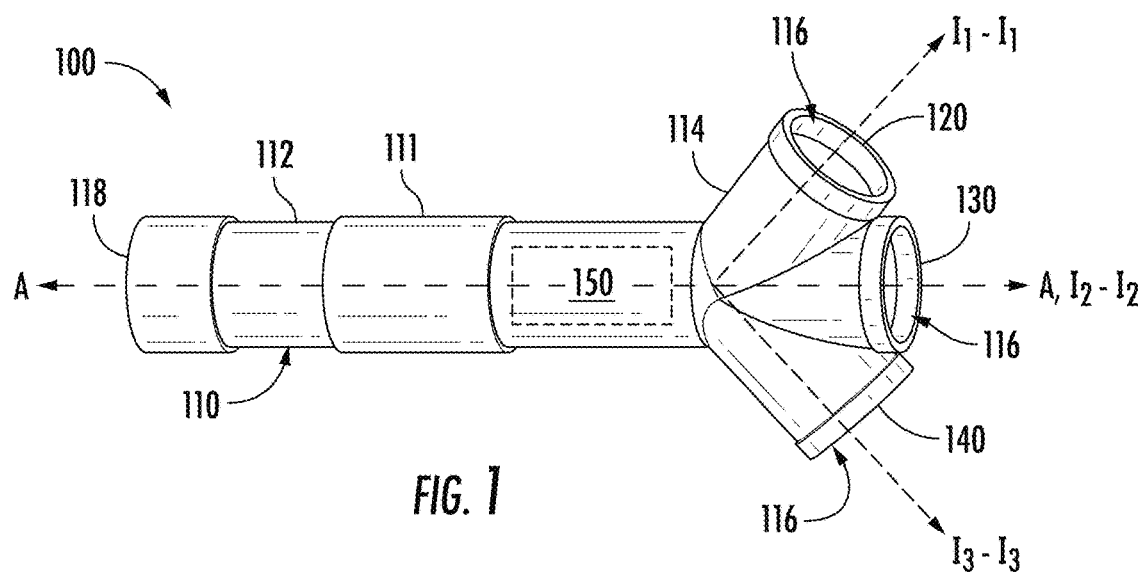
FIG. 1 is a perspective view of a light in accordance with embodiments of the present disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Referring now to FIG. 1, a light 100 in accordance with embodiments of the present disclosure is shown. The light 100 includes a housing 110, a first or upper illumination assembly 120, a second or primary illumination assembly 130, a third or lower illumination assembly 140, and a control unit 150. The control unit 150 is configured to selectively switch each illumination assembly 120, 130, 140 between an on state in which the respective illumination assembly 120, 130, 140 emits a light beam L (FIG. 13) and an off state in which the illumination assembly 120, 130, 140 emits no light beam. The control unit 150 selectively switches the illumination assemblies 120, 130, 140 based on the position of the light 100 with respect to the force of gravity acting on the light 100. In embodiments, switching a respective illumination assembly 120, 130, 140 between the on state and the off state based on the position of the light 100 may allow the light 100 to constantly illuminate a visual field V of an operator when the light 100 is held in different positions. Additionally or alternatively, in some embodiments, moving the light 100 between positions may alter properties of the light beam emitted by the illumination assemblies 120, 130, 140 including, but not limited to, brightness, color, beam angle, or combinations thereof as described below.

The housing 110 contains the illumination assemblies 120, 130, 140 and the control unit 150. The housing 110 has a mounting or handle portion 112 and an illumination portion 114. The handle portion 112 may define a cavity sized and dimensioned to contain the control unit 150 therein. The handle portion 112 defines a central axis A-A of the light 100. The illumination portion 114 defines a plurality of receptacles 116 to receive and position a respective illumination assembly 120, 130, 140 within the housing 110. The housing 110 may also include a mode control 118, e.g., a button or a switch, that manually controls functionalities of the light 100. In embodiments, the mode control 118 may turn the light 100 between an on mode in which electrical energy is delivered to the control unit 150 and the illumination assemblies 120, 130, 140, and an off mode in which electrical energy is cut off from the control unit 150 and the illumination assemblies 120, 130, 140. In embodiments, the mode control 118 may lock the light 100 in the active state thereof. For example, the mode control 118 may be used to lock one or more of the illumination assemblies 120, 130, 140 in the on state or the off state. The mode control 118 may be located at any desired location on the housing 110. For example, the mode control 118 may be a button located on an end of the handle portion 112 opposite of the receptacles 116. In such an embodiment, pressing the mode control 118 once may turn the light 100 to the on mode or the off mode and pressing the mode control 118 twice in rapid succession may lock and unlock the state of the light 100. In certain embodiments, the light 100 includes more than one mode control 118 to manually control each illumination assembly 120, 130, 140.

Figure 2:
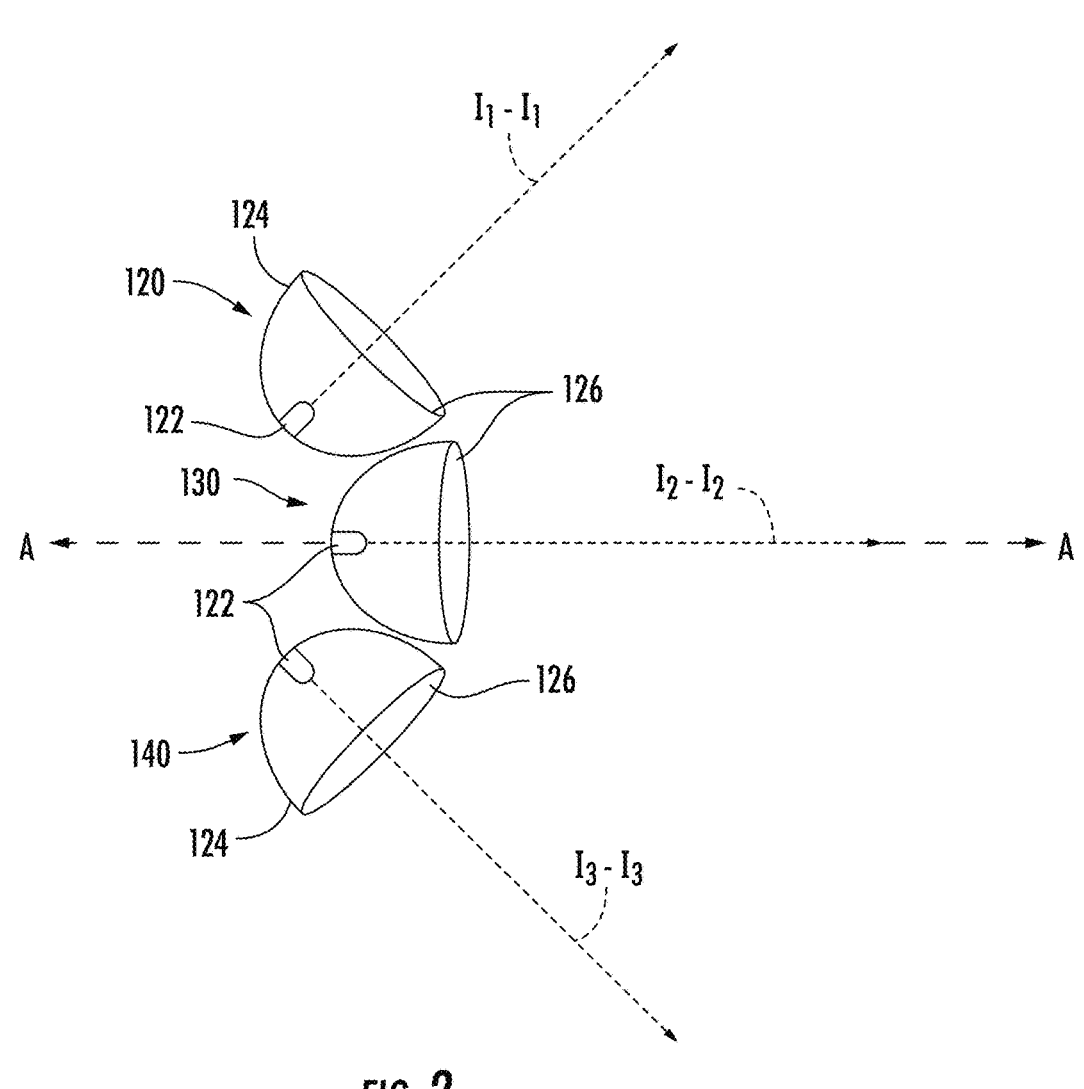
FIG. 2 is a side view of illumination assemblies of the light of FIG. 1.

Additionally referring to FIGS. 2 and 3, the illumination portion 114 may fix each illumination assembly 120, 130, 140 within the housing 110 such than a respective center illumination axis I-I of each illumination assembly 120, 130, 140 is positioned relative to the central axis A-A of the light 100. The center illumination axis I-I of each illumination assembly 120, 130, 140 is the axis that forms the center of a cone or beam of light extending from an illumination element 122 of each illumination assembly 120, 130, 140 that the light beam L emitted therefrom travels. For example, as shown in FIG. 2, the primary illumination assembly 130 emits a light beam L along a second center illumination axis $I_2$-$I_2$ that is parallel with the central axis A-A. The upper illumination assembly 120 emits a light beam L along a first center illumination axis $I_1$-$I_1$ and the lower illumination assembly 140 emits a light beam L along a third center illumination axis $I_3$-$I_3$ that are both offset at an angle to the central axis A-A. The upper and lower illumination assemblies 120, 140 may be positioned in the housing 110 such that the first center illumination axis $I_1$-$I_1$ and the third center illumination axis $I_3$-$I_3$ are offset from the central axis A-A at an angle in a range of 10 degrees to 70 degrees, e.g., 20 degrees, 45 degrees, or 60 degrees. The illumination assemblies 120, 130, 140 may be aligned along a vertical axis B-B, as shown in FIG. 3, such that the center illumination axes $I_1$-$I_1$, $I_2$-$I_2$, $I_3$-$I_3$ are coplanar with each other. In some embodiments, housing 110 may be formed such that the illumination assemblies 120, 130, 140 offset from each other in a lateral direction from the vertical axis B-B. For example, the primary illumination assembly 130 may be centrally aligned with vertical axis B-B and the upper and lower illumination assemblies 120, 140 may be offset laterally from the vertical axis B-B in the same direction or the opposite direction, as shown in FIGS. 4 and 5.

Continuing to refer to FIGS. 1 and 2, each illumination assembly 120, 130, 140 includes one or more illumination elements 122, a reflector 124, and a lens 126. The illumination element 122 may be any suitable light emitting element including, but not limited to, light emitting diodes (LED), incandescent light bulbs, halogen lamps, fluorescent lamps, ultraviolet (UV) lamps, infrared (IR) diodes, laser diodes, or chip on board (COB). The illumination element 122 may emit a light beam L of any desired wavelength such as visible light, infrared light, laser light, or ultraviolet light. In some embodiments, each illumination assembly 120, 130, 140 has a plurality of illumination elements 122. In such an embodiment, each illumination element 122 may be identical. For example, each illumination assembly 120, 130, 140 may have three LEDs that emit light beams in the visible spectrum. In some embodiments, each illumination assembly 120, 130, 140 has a plurality of illumination elements 122 that are each different. For example, each illumination assembly 120, 130, 140 may have one illumination element 122 that emits visible light, another illumination element 122 that emits infrared light, and a third illumination element 122 that emits a laser beam. In some embodiments, a first set of illumination elements 122 may be positioned centrally within a respective illumination assembly 120, 130, 140 and a second set of illumination elements 122 may be positioned concentrically around the first set of illumination elements 122 within the respective illumination assembly 120, 130, 140. In such an embodiment, the first set of illumination elements 122 may be a surface-mounted device (SMD) LED and the second set of illumination elements 122 may be a chip-on-board (COB) LED. Each illumination element 122 may be independently controlled. In some embodiments, illumination element 122 may emit a light beam L with a beam angle γ in a range of 10 degrees to 50 degrees, e.g., 15 degrees or 30 degrees. The beam angle γ may be adjustable as described below.

The reflector 124 of each illumination assembly 120, 130, 140 reflects and directs light emitted from the illumination elements 122. The reflectors 124 are shaped to reflect the light out of the respective illumination assembly 120, 130, 140 in a direction of a respective center illumination axis I-I. The reflectors 124 may be generally parabolic in shape. In embodiments, the interior surface of the reflectors 124 may be smooth. In some embodiments, the interior surface of the reflectors 124 may be textured.

Each lens 126 encloses each illumination assembly 122. Each lens 126 may be transparent or translucent to allow transmission of light emitted by the illumination elements 122. The lenses 126 may alter the light transmitted therethrough or allow transmission of light without alteration. For example, lenses 126 may have uniform thickness such that the light transmitted therethrough is not altered. In embodiments, the lenses 126 may be convex or concave to focus or disperse the light transmitted therethrough. For example, lenses 126 may be a biconvex lens, a plano-convex lens, a positive meniscus lens, a negative meniscus lens, a plano-concave lens, or a biconcave lens. The lens 126 may be made of glass or plastic. The lenses 126 may be ground, polished, or molded to the desired shape. The lens 126 may allow for manual adjustment of a beam angle γ. For example, the lens 126 may be moved closer or farther from the illumination element 122 to increase or decrease the beam angle γ. In embodiments, the lens 126 may be adjusted by rotation of a threaded fixture that holds the lens 126. In such embodiments, the operator may rotate the threaded fixture clockwise to move lens 126 closer to the illumination element 122 and may rotate the fixture counterclockwise to move the lens 126 farther from the illumination element 122. In certain embodiments, lens 126 may be adjusted automatically. For example, the threaded fixture may be moved closer or farther from the illumination element 122 in response to the position of the light 100.

Figure 6:
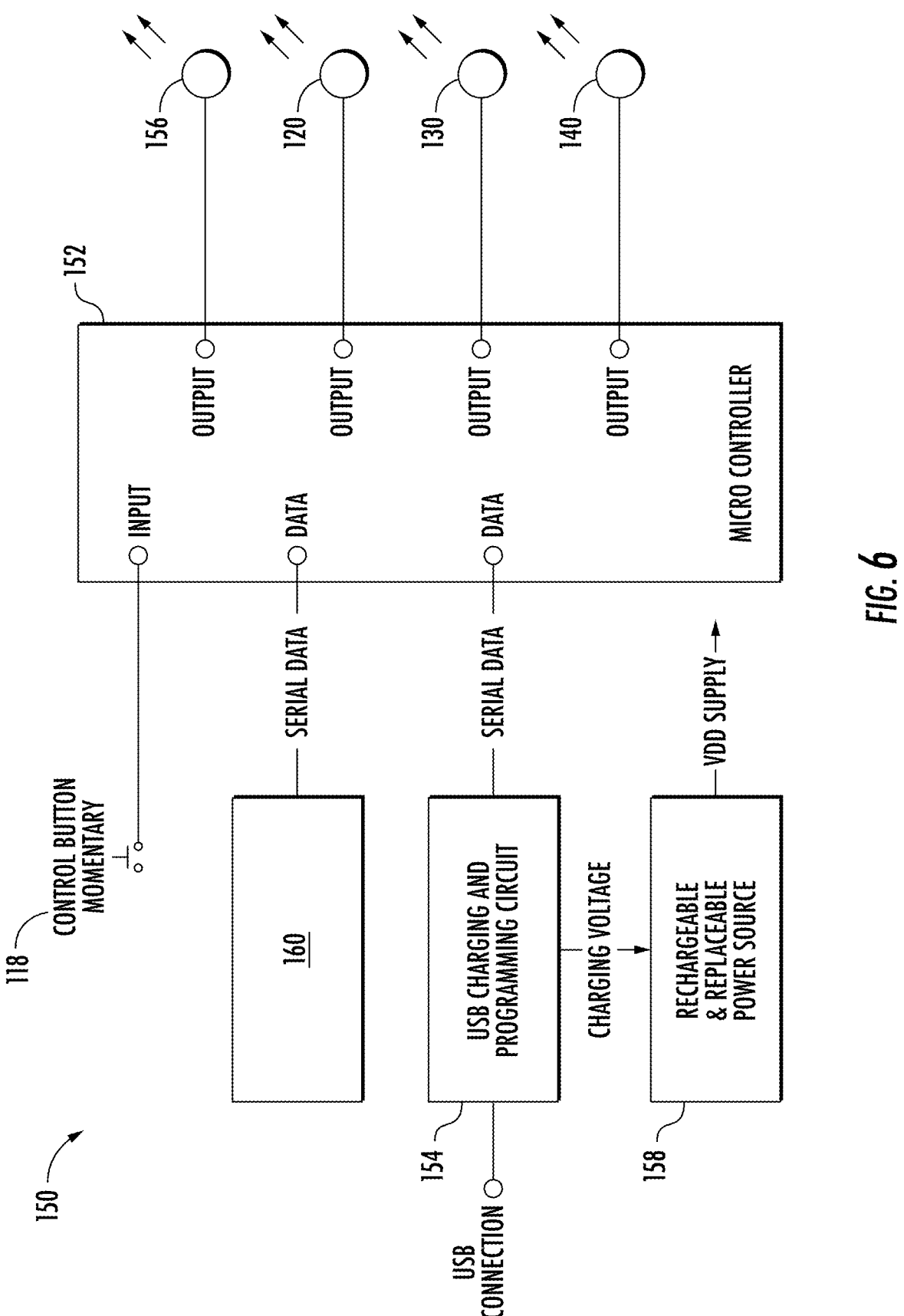
FIG. 6 is a block diagram of a control unit of the light of FIG. 1 in accordance with embodiments of the present disclosure.

Referring to FIG. 6, a block diagram illustrating a schematic overview of the control unit 150 is shown. The control unit 150 is configured to switch the illumination assemblies 120, 130, 140 between the on state and the off state based on the position of the light 100 with respect to the direction of the force of gravity. The control unit 150 includes a microcontroller 152, a charging circuit 154, and a sensor 160. The microcontroller 152 is in electrical communication with the charging circuit 154, the sensor 160, a status indicator 156, and the illumination assemblies 120, 130, 140. The microcontroller 152 receives position data from the sensor 160 and switches the illumination assemblies 120, 130, 140 between the on state and the off state based on the position data. Additionally or alternatively, in some embodiments, the control unit 150 may alter properties of the light beam emitted by the illumination assemblies 120, 130, 140 including, but not limited to, brightness, color, beam angle, or combinations thereof. The microcontroller 152 may be a commercially available microcontroller 152, e.g., a microcontroller from one of the PIC24F families of microcontrollers available from Microchip Technology, Inc.

The charging circuit 154 controls the charging behavior of an energy source 158. The energy source 158 may be a battery. The energy source 158 may be a rechargeable battery. In some embodiments, the energy source 158 may be a replaceable battery, e.g., AA batteries or AAA batteries. The energy source 158 may be positioned within the housing 110. For example, the energy source 158 may be contained within the cavity defined by the handle portion 112. The charging circuit 154 may allow for programing and optimization of the charging behavior of the energy source 158. The energy source 158 may be charged through the charging circuit 154 to prevent damage to the energy source 158. The status indicator 156 indicates the status of the energy source 158. For example, the status indicator 156 may indicate when the energy source 158 is charging, fully charged, or low charged. Additionally or alternatively, the microcontroller 152 may be programed through the charging circuit 154 for customization of the functionalities of the light 100 as described below.

Figures 7, 8, 9, 10:
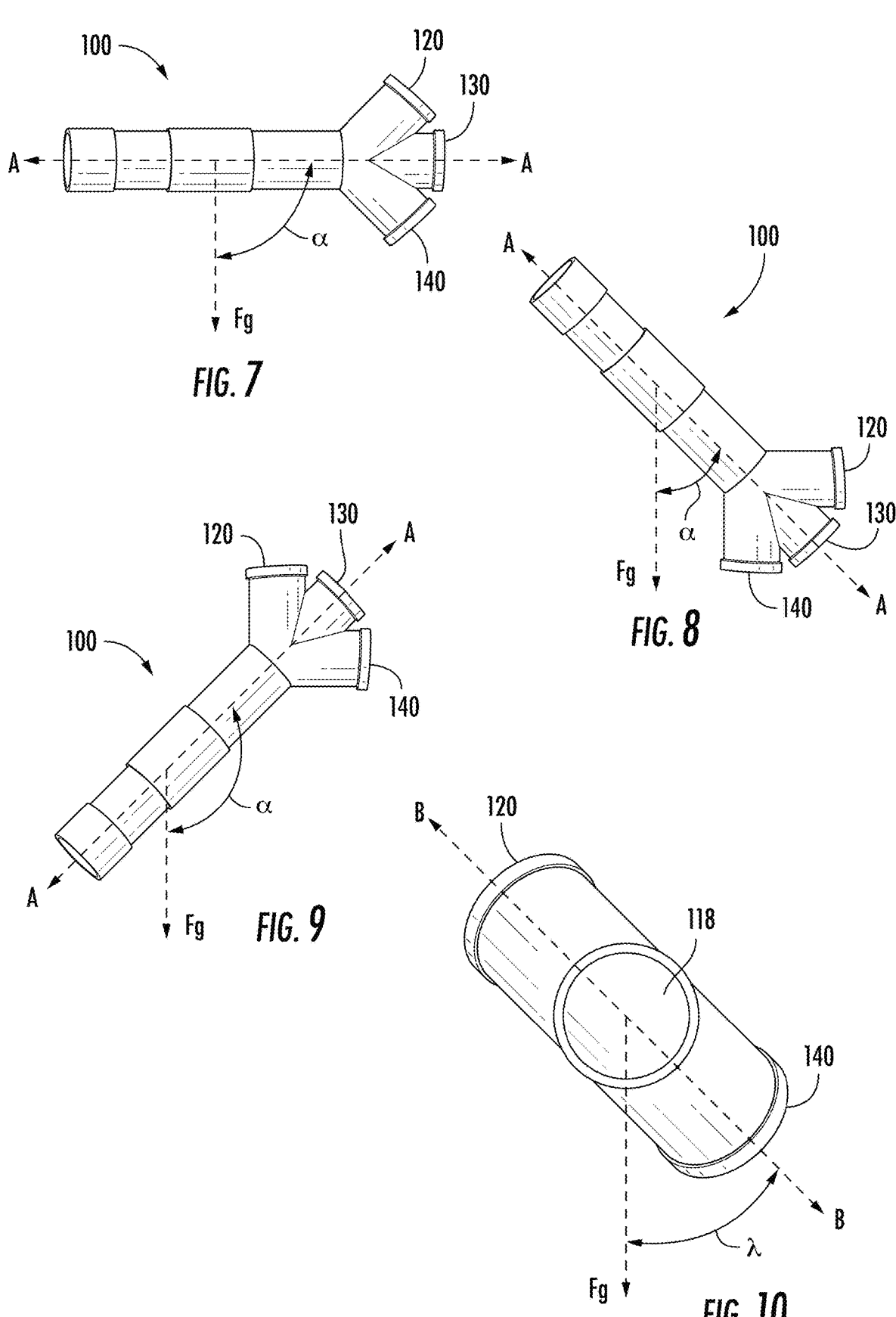
FIG. 7 is a side view of the light of FIG. 1 in a primary position thereof.
FIG. 8 is a side view of the light of FIG. 1 in a downward position thereof.
FIG. 9 is a side view of the light of FIG. 1 in an upward position thereof.
FIG. 10 is a rear view of the light of FIG. 1 in a rolled position thereof.

Additionally referring to FIGS. 7-9, the sensor 160 is adapted for detecting the position of the central axis A-A with respect to the direction of the force of gravity. Specifically, the sensor 160 is disposed within the housing 110 of the light 100 to detect when the central axis A-A is pitched to an upwards position, a downwards position, or a primary position. The sensor 160 may detect the position of the central axis A-A based on a pitch angle $\alpha$ defined between the vector representing the force of gravity $F_g$ and the central axis A-A of the light 100. For example, the light 100 may be detected as being in the primary position (FIG. 7) when the pitch angle $\alpha$ is in a range between 60 degrees and 120 degrees, e.g., 90 degrees. When the sensor 160 detects the light 100 as being in the primary position, the primary illumination assembly 130 may be in the on state. The light 100 may be detected to be in the downwards position (FIG. 8). When the sensor 160 detects that the light 100 is in the downwards position, the pitch angle $\alpha$ may be in a range of 15 degrees to 60 degrees, e.g., 45 degrees, and the upper illumination assembly 120 may be in the on state. The light 100 may be detected to be in the upwards position (FIG. 9). When the sensor 160 detects the light 100 as being in the upwards position, the pitch angle $\alpha$ may be in a range of 120 degrees to 160 degrees, e.g., 135 degrees, the lower illumination assembly 140 may be in the on state. In some embodiments, the sensor 160 may detect when the light 100 is in a vertical position, e.g., straight up or straight down. The light 100 may be detected as being in the vertical position when the pitch angle $\alpha$ is in a range of −15 degrees to 15 degrees, e.g., 0 degrees, or when the pitch angle $\alpha$ is in a range of 160 degrees to 195 degrees, e.g., 180 degrees. When the light 100 is in the vertical position all of the illumination assemblies 120, 130, 140 may be in the off state.

In some embodiments, the pitch angle $\alpha$ for adjacent positions overlap. For example, pitch angle $\alpha$ for the primary position may overlap with the pitch angle $\alpha$ for the upwards position or the downwards position. In such an embodiment, the pitch angle $\alpha$ for the primary position may be in a range of 55 degrees to 125 degrees, the pitch angle $\alpha$ for the upwards position may be in a range of 115 degrees to 160 degrees, and the pitch angle $\alpha$ for the downwards position may be in a range of 15 degrees to 65 degrees. The portions of the overlapping pitch angles $\alpha$ may be referred to as buffer zones. When the light 100 is in a buffer zone, the control unit 150 switches adjacent illumination assemblies 120, 130, 140 to the on state based on movement of the light 100. For example, when the light 100 moves from the primary position to the upwards position the primary illumination assembly 130 and the lower illumination assembly 140 may both be in the on state when the light 100 is in the buffer zone. In some embodiments, the illumination assemblies 120, 130, 140 may gradually increase in brightness or decrease in brightness when in the buffer zone to smoothly transition between the on state and the off state. For example, when the light 100 moves from the primary position to the upwards position the primary illumination assembly 130 may decrease in brightness and the lower illumination assembly 140 may increase in brightness as the light 100 moves through the buffer zone. In embodiments, the gradual increase in brightness and the gradual decrease in brightness may be controlled by the beam brightness control circuitry 162 of the control unit 150', as described below.

In some embodiments, each position may have an activation pitch in which the respective illumination assembly 120, 130, 140 is switched to the on state and a deactivation pitch in which the respective illumination assembly 120, 130, 140 is switched to the off state. The activation pitch for adjacent positions may be separated from each other and the deactivation pitch for adjacent positions may overlap. For example, the pitch angle $\alpha$ for the activation pitch of the primary position may be 75 degrees or 105 degrees and the pitch angle $\alpha$ for the deactivation pitch of the primary position may be 60 degrees or 135 degrees. The pitch angle $\alpha$ for the activation pitch of the upwards position may be 135 degrees and the pitch angle $\alpha$ for the deactivation pitch of the upwards position may be 105 degrees. The pitch angle $\alpha$ for the activation pitch of the downwards position may be 60 degrees and the pitch angle $\alpha$ for the deactivation pitch of the upwards position may be 75 degrees. In embodiments, the activation pitch for a respective position may be equal to the deactivation pitch of an adjacent position. Each position may have more than one activation pitch and deactivation pitch, e.g., an upper and lower activation pitch and deactivation pitch. Providing each position with an activation pitch and a deactivation pitch may prevent flickering, e.g., rapidly switching between on states and off states, of the illumination assemblies 120, 130, 140. For example, when the light 100 moves from the primary position towards the upwards position the primary illumination assembly 130 may remain in the on state until the light 100 reaches the deactivation pitch of the primary position, e.g., 135 degrees, at which point the primary illumination assembly 130 switches to the off state. In embodiments where the activation pitch of the upwards position is equal to the deactivation pitch of the primary position, e.g., 135 degrees, the lower illumination assembly 140 concurrently switches to the on state when the primary illumination assembly 130 switches to the off state. The lower illumination assembly 140 may remain in the on state until the light 100 is moved to the deactivation pitch of the upwards position, e.g., 105 degrees. By each position having an independent activation pitch and deactivation pitch, inadvertent movement between positions may be reduced and flickering of the illumination assemblies 120, 130, 140 may be prevented.

Referring to FIG. 10, in embodiments, the sensor 160 may detect the position of the light 100 in more than one axis. For example, the sensor 160 may detect the pitch of the light 100, as described above, and may detect the radial position of the light 100 about the central axis A-A. In such an embodiment, the light 100 may be rolled a roll angle A defined between the vector of the force of gravity $F_g$ and the vertical axis B-B. The sensor 160 may detect rolling of the light 100 in either the clockwise or counterclockwise directions about the central axis A-A. The light 100 may be detected as being in a rolled position when the roll angle 2 is in a range of 30 degrees to 65 degrees, e.g., 45 degrees. Rolling the light 100 about the central axis A-A may switch all of the illumination assemblies 120, 130, 140 to the on state. In some embodiments, rolling the light 100 about the central axis A-A may switch one or more of the illumination assemblies 120, 130, 140 to a strobe state in which the illumination assemblies 120, 130, 140 emit a flashing light. In certain embodiments, rolling the light 100 in a clockwise direction may switch all of the illumination assemblies 120, 130, 140 to the on state and rolling the light 100 in a counterclockwise direction may switch one or more of the illumination assemblies 120, 130, 140 to the strobe state.

The sensor 160 may include one or more of inclinometer, an accelerometer, a three-axis gyroscope, or a compass. In certain embodiments, the sensor 160 includes an inclinometer and an accelerometer. For example, the sensor 160 may be a ADIS16209 High Accuracy, Dual-Axis Digital Inclinometer and Accelerometer available from Analog Devices, Inc. When the sensor 160 includes both an inclinometer and an accelerometer, the inclinometer and the accelerometer may cooperate to switch the illumination assemblies 120, 130, 140 between states. Specifically, the inclinometer may detect the pitch of the light 100 and the accelerometer may detect movement of the central axis A-A from one position towards another position. Detecting both pitch and movement of the central axis A-A may prevent or reduce lag in switching the illumination assemblies 120, 130, 140 between states and maintain constant illumination of the visual field V of the operator. In particular embodiments, the sensor 160 may be a plurality of mercury switches. In such an embodiment, as the light 100 is positioned liquid mercury in the mercury switches may complete a circuit and switch a respective illumination assembly 120, 130, 140 between states.

Figure 11A:
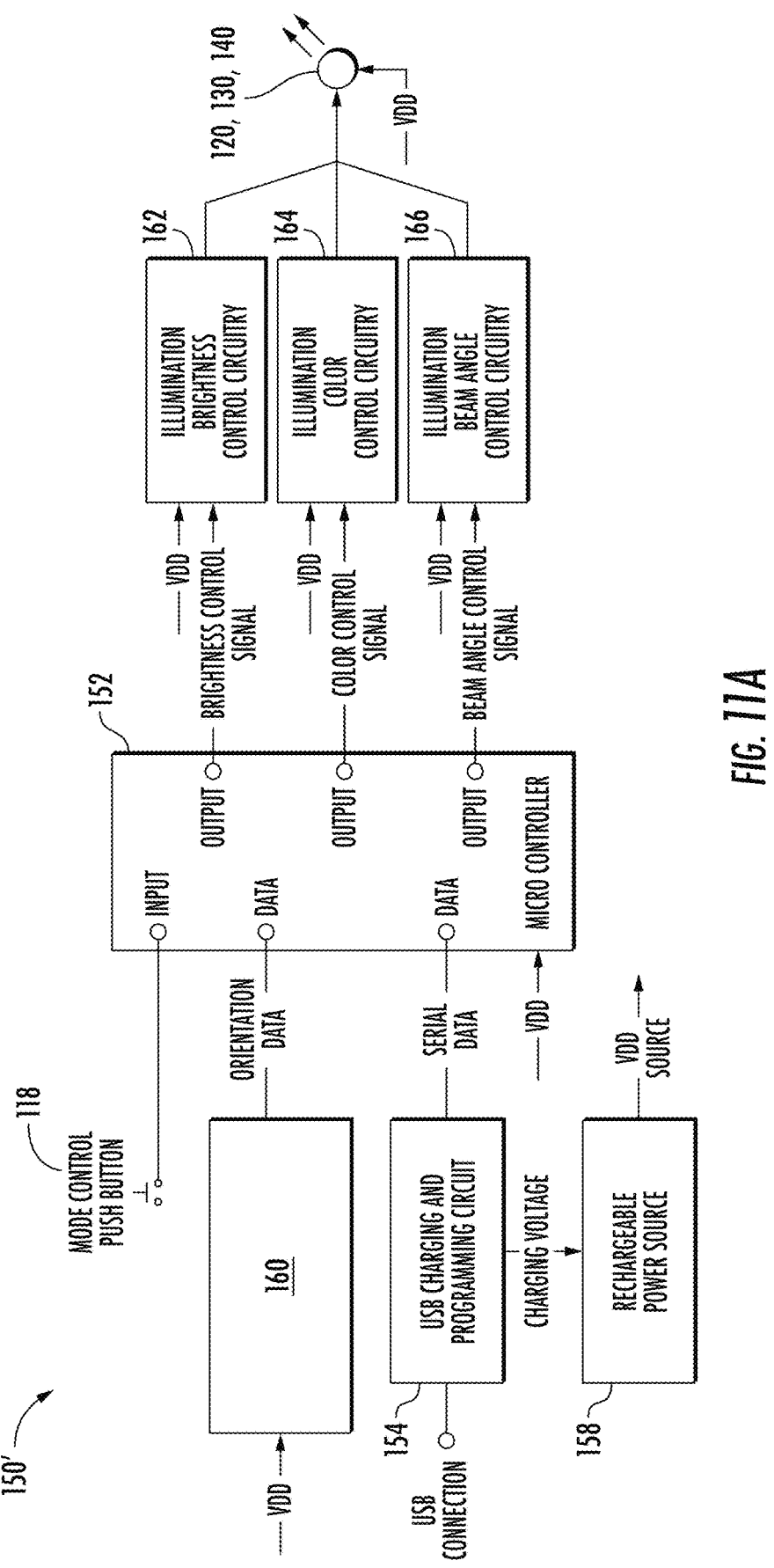
FIG. 11A is a block diagram of another control unit of the light of FIG. 1 in accordance with embodiments of the present disclosure.

Referring to FIG. 11A, another block diagram illustrating another schematic of the control unit 150' is shown. The control unit 150' includes the microcontroller 152, the charging circuit 154, and the sensor 160. In addition, the control unit 150' may include one or more circuits for controlling functionalities of the illumination assemblies 120, 130, 140. For example, the control unit 150' may include one or more of a beam brightness control circuit 162, a beam color control circuit 164, or a beam angle control circuit 166. The beam brightness control circuit 162 may increase or decrease the brightness of the light beam L emitted by a respective illumination assembly 120, 130, 140. The beam brightness control circuit 162 may adjust the brightness of an illumination assembly 120, 130, 140 to be in a range of 150 lumens to 3,000 lumens, e.g., 500 lumen or 1200 lumens. The beam brightness control circuit 162 may adjust the brightness of an illumination assembly 120, 130, 140 by modulating the electrical energy, e.g., the voltage or current, delivered to an illumination element 122. For example, the beam brightness control circuit 162 may adjust the brightness of an illumination assembly 120, 130, 140 by pulse width modulation (PWM).

The beam color control circuit 164 may change the color or temperature of the light beam L emitted by a respective illumination assembly 120, 130, 140. The beam color control circuit 164 may change the color or temperature of the light beam L by modulating the electrical energy delivered to an illumination element 122 to alter the wavelength of the light beam L emitted by the illumination element 122. In such an embodiment, the illumination element 122 may be an LED configured to emit light at wavelengths spanning the visible light spectrum. In some embodiments, the beam color control circuit 164 may change the color or temperature of the light beam L by modulating the electrical energy delivered to a plurality of illumination elements 122 that each emit a different color of light to blend the light beams and achieve a light beam L with the desired color. For example, one or more of the illumination assemblies 120, 130, 140 may have three illumination elements 122. Each of the three illumination elements 122 may emit a different color such as red light, green light, or blue light. The beam color control circuit 164 may modulate the light beam L emitted from each three illumination elements 122 to achieve the desired color of light emitted by the respective illumination assembly 120, 130, 140 by varying the amount of red, green, and blue light emitted from the three illumination elements 122.

The beam angle control circuit 166 may adjust the beam angle $\gamma$ of the light beam, i.e., the spread of the light beam, emitted from a respective illumination assembly 120, 130, 140. The beam angle control circuit 166 may adjust the beam angle $\gamma$ by modulating the electrical energy delivered to the illumination elements 122 of a respective illumination assembly 120, 130, 140. For example, each illumination assembly 120, 130, 140 may include an array of illumination elements 122, e.g., a 9-by-9 array of illumination elements 122. The beam angle control circuit 166 may adjust the beam angle $\gamma$ by turning individual illumination elements 122 in the array on or off and/or increasing or decreasing the brightness of the illumination elements 122. The beam angle control circuit 166 may increase the beam angle $\gamma$ by turning on more of the illumination elements 122 in the array and may decrease the beam angle $\gamma$ by turning on fewer of the illumination elements 122 in the array. The beam angle $\gamma$ may be adjusted by the beam angle control circuit 166 to be in a range of 5 degrees to 120 degrees, e.g., 5 degrees, 15 degrees, 30 degrees, 45 degrees, 60 degrees, 75 degree, 90 degrees, 105 degrees, or 120 degrees.

Figure 11B:
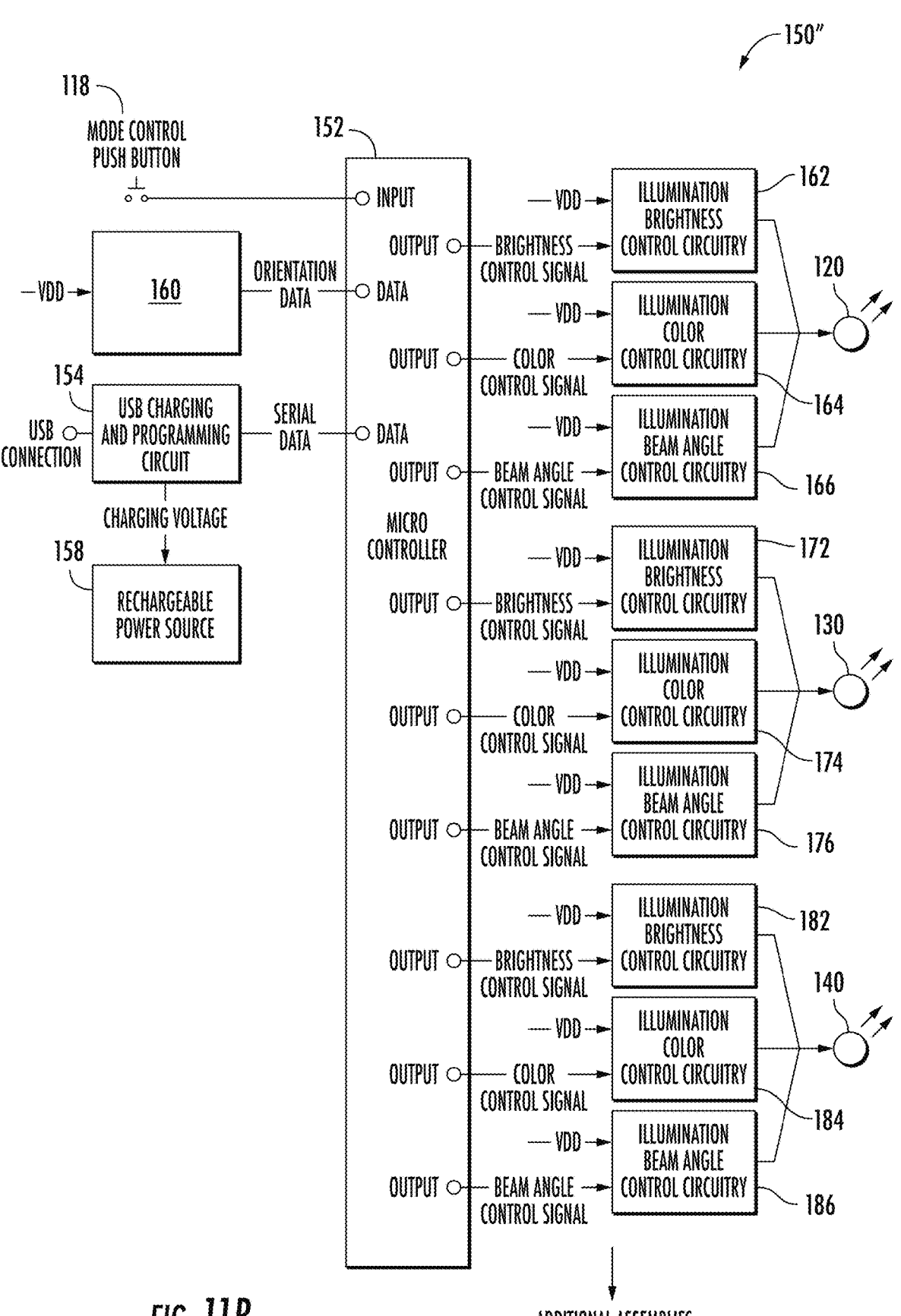
FIG. 11B is a block diagram of another control unit of the light of FIG. 1 in accordance with embodiments of the present disclosure.

Referring to FIG. 11B, another block diagram illustrating another schematic of the control unit 150" is shown. The control unit 150" is substantially similar to the control unit 150'. As such on the differences will be described herein for reason of brevity. The control unit 150" includes dedicated circuits for controlling functionalities of the respective illumination assemblies 120, 130, 140. For example, a beam brightness control circuit 162, a beam color control circuit 164, and a beam angle control circuit 166 may control the functionalities of the upper illumination assembly 120. A beam brightness control circuit 172, a beam color control circuit 174, and a beam angle control circuit 176 may control the functionalities of the primary illumination assembly 130. A beam brightness control circuit 182, a beam color control circuit 184, and a beam angle control circuit 186 may control the functionalities of the lower illumination assembly 140. The control unit 150" may be expanded to control any number of illumination assemblies with any desired number of control circuits. For example, in some embodiments the control unit 150" may be used in a system included a number of illumination assemblies in a range of 10 illumination assemblies to 200 illumination assemblies, e.g., 15, 25, 50, 100, or 150. In certain embodiments, the number of illumination assemblies may exceed 200 illumination assemblies.

In some embodiments, the functionality of the light 100 is customizable by an operator via software to the preferences of the operator. The light 100 may be in signal communication with an external computer with the software for customization. The light 100 may be in signal communication with the computer through a hardwired connection, e.g., a USB connection, or in wireless communication, e.g., Bluetooth® or Wi-Fi. Specifically, the charging circuit 154 may be configured for programing the microcontroller 152. The microcontroller 152 may be programed through the software to change some or all of the functional features described above. For example, the microcontroller 152 may be programed such that each illumination assembly 120, 130, 140 has the same brightness when in the on state. In embodiments, the microcontroller 152 may be programmed such that the upper and lower illumination assemblies 120, 140 have a brightness of 500 lumens when in the on state and the primary illumination assembly 130 has a brightness of 1000 lumens when in the on state. Furthermore, all ranges and angles described herein may be customized via the software. For example, the operator may define the primary position, the upwards position, and the downwards position as desired. In particular embodiments, the light 100 may be customized through imitation learning in which the operator programs the microcontroller 152 by moving the light 100 to a desired position or through a desired range of motion for programing. In such an embodiment, the operator may hold the light 100 in a first position, the sensor 160 will detect the pitch of the central axis A-A, and the microcontroller 152 may be programed to define that first position as the primary position.

Figure 12:
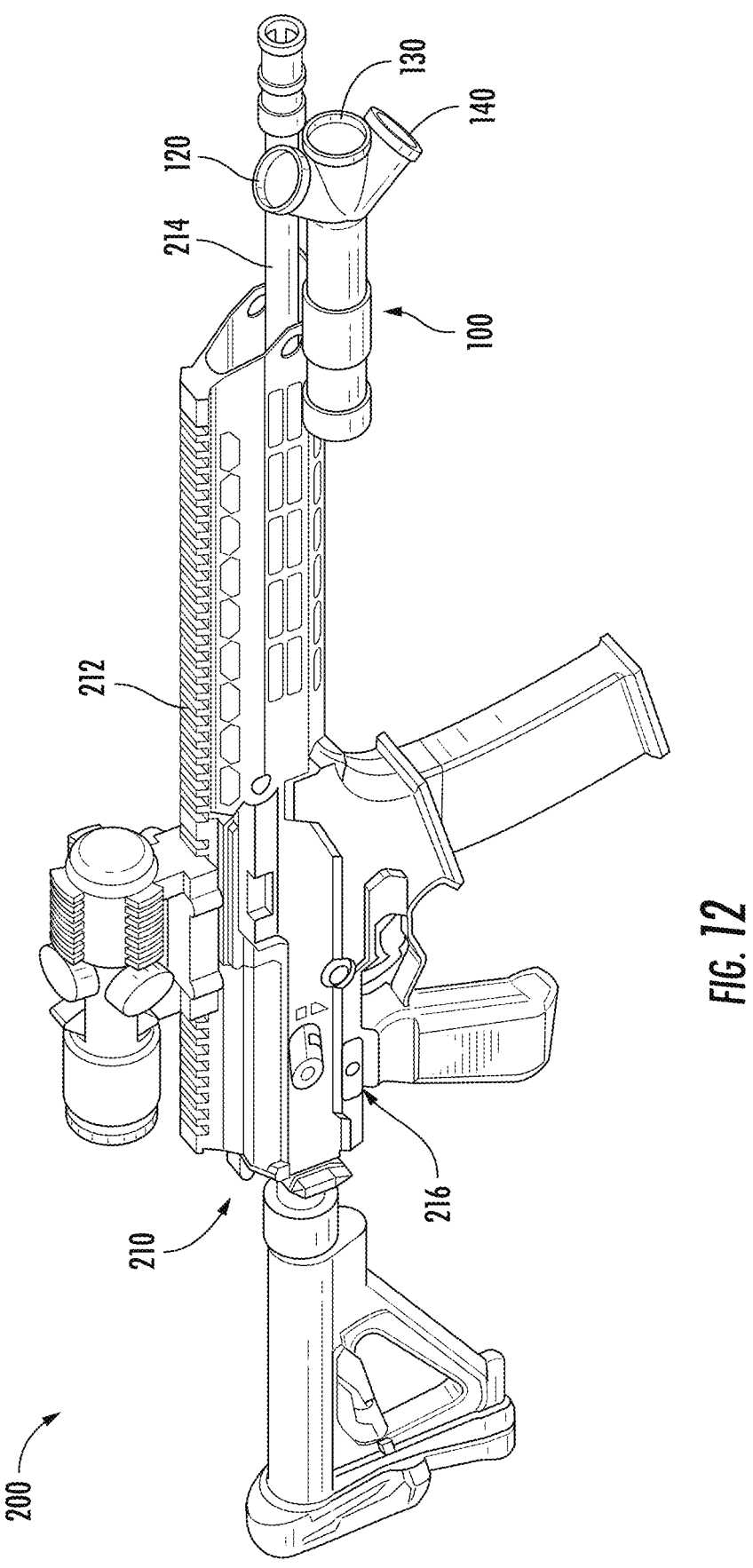
FIG. 12 is a perspective view of a weapons system including the light of FIG. 12 in accordance with embodiments of the present disclosure.
Figure 13:
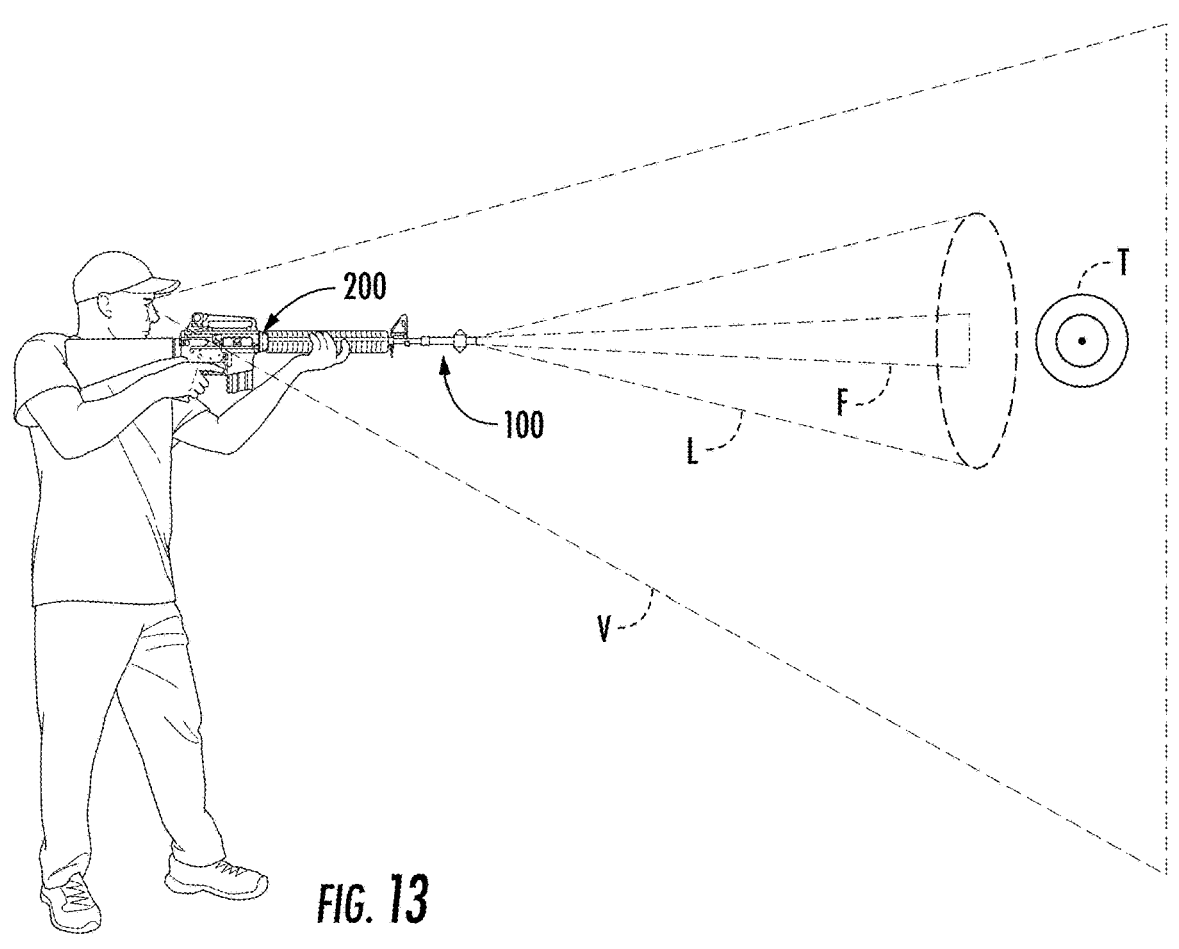
FIG. 13 is a side view of an operator holding the weapons system of FIG. 12 in a target engagement posture.

Referring now to FIG. 12, a weapons system 200 in accordance with embodiments of the present disclosure is shown. The weapons system 200 includes a weapons platform 210 and the light 100 mounted to the weapons platform 210. The weapons system 200 may be held or carried by an operator in a plurality of postures, e.g., a high ready posture (FIG. 15), a low ready posture (FIG. 17), or a target engagement posture (FIG. 13). Each position of the light 100 may correspond to a posture of the weapons system 200 such that when the weapons system 200 is in a respective posture the light 100 is in the corresponding position. The weapons system 200 may illuminate a field of fire F of the weapons system 200 when in the target engagement posture and may illuminate the visual field V of the operator in any of the plurality of postures with a light beam L. Specifically, control unit 150 of the light 100 detects the position of the light 100 and switches one or more of illumination assemblies 120, 130, 140 between the on state and the off state based on position of the light 100 and the corresponding posture of the weapons system 200 to illuminate the field of fire F or the visual field V of the operator. Additionally or alternatively, in some embodiments, moving the light 100 between positions may alter properties of the light beam emitted by the illumination assemblies 120, 130, 140 including, but not limited to, brightness, color, beam angle, or combinations thereof.

The weapons platform 210 may be a rifle, shotgun, crossbow, handgun, or other ranged small arms weapon. The weapons platform 210 may have a conventional rail system 212, e.g., picatinny rails or weaver rails, for mounting accessories. The light 100 may include a mounting bracket 111 (FIG. 1) configured to mount to the weapons platform 210. In some embodiments, the light 100 may be integrally formed with the weapons platform 210 such that the weapons system 200 is formed as a unitary body. When the light 100 is mounted to the weapons platform 210, the central axis A-A of the light 100 may be parallel with a barrel 214 of the weapons platform 210. The barrel 214 may define an aiming axis of the weapons platform 210. In some embodiments, the weapons platform 210 may include a remote selector 216 for manually selecting function of the light 100. The remote selector 216 may be located near the grip or trigger of the weapons platform 210 to allow the operator to easily access the remote selector 216 and maintain control of the weapons platform 210. The remote selector 216 may be in signal communication with the light 100 through a hardwired connection or a wireless connection.

Referring to FIGS. 13-20, the weapons system 200 is shown in a plurality of postures. As an operator moves the weapons system 200 between the postures the control unit 150 of the light 100 detects the position of the light 100 and switches the illumination assemblies 120, 130, 140 between the on state and the off state based on the position of the light 100. Switching respective illumination assemblies 120, 130, 140 to the on state based on the posture of the weapons system 200 may maintain constant illumination of the visual field V of the operator in each posture. FIGS. 14, 16, 18, 19, and 20, each illustrate an example range of motion for each posture indicated by shading. When the weapons system 200 pitched or rolled such that the light 100 falls within the shaded region, the weapons system 200 may be considered to be in the respective posture. In FIGS. 14, 16, 18, 19, and 20, the force of gravity $F_g$ is considered to be acting at the zero (0) degree mark.

Figure 14:
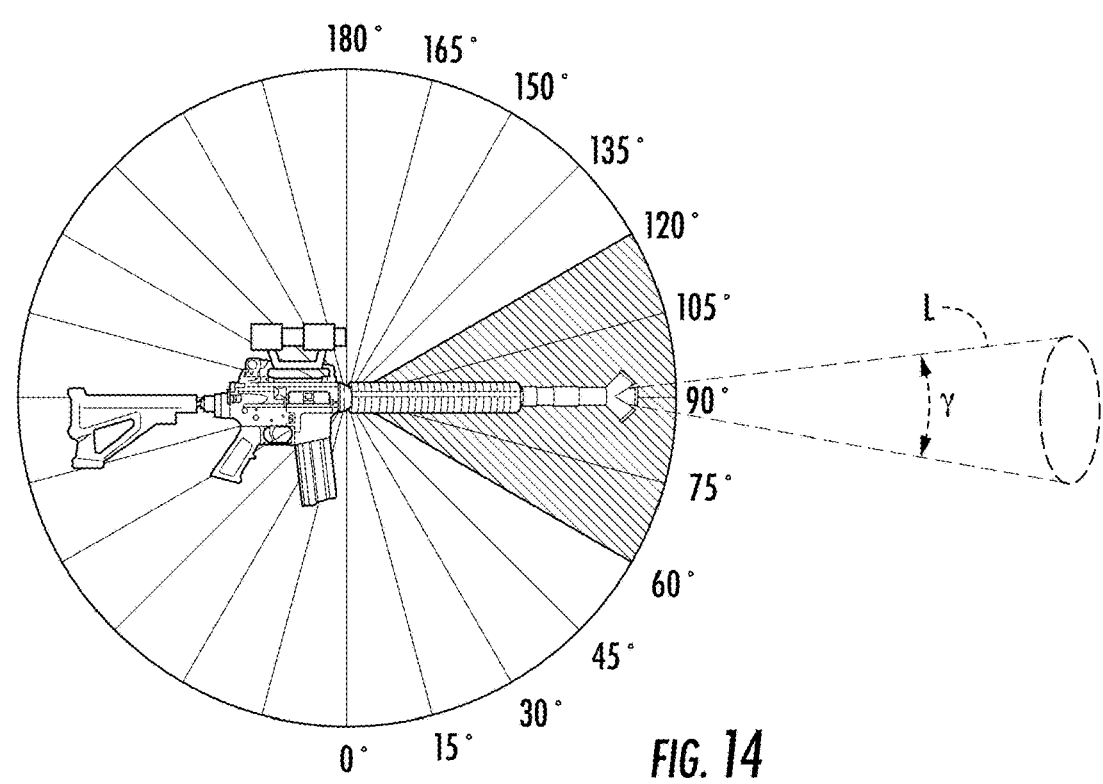
FIG. 14 is a schematic illustration depicting a range of motion for the target engagement posture of the weapons system of FIG. 12.

Particularly referring to FIGS. 13 and 14, the weapons system 200 is shown in a target engagement posture in which the operator is aiming the weapons system 200 at a target T. The primary position of the light 100 may correspond to the target engagement posture of the weapons system 200. In the target engagement posture, the light 100 is in the primary position with the primary illumination assembly 130 in the on state to illuminate the field of fire F of the weapons system 200 and the field of the view of the operator. The field of fire F is the area that projectiles fired from the weapons platform 210 may easily reach and, as used herein, generally refers to the direction the muzzle of the barrel 214 is pointed in a given posture. For example, as shown in FIG. 13, the field of fire F of the weapons system 200 is the same as the visual field V of the operator when the weapons system 200 is in the target engagement posture.

Figure 15:
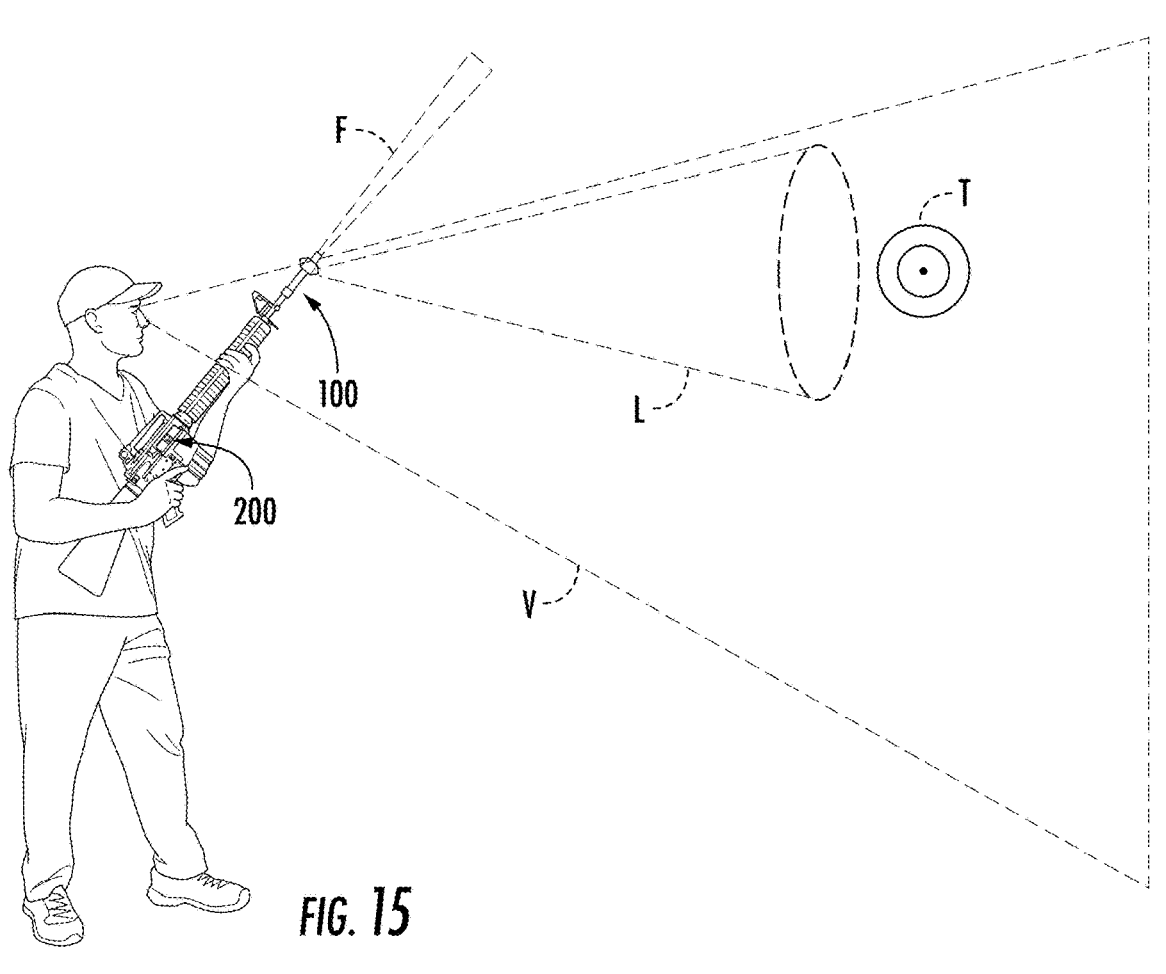
FIG. 15 is a side view of an operator holding the weapons system of FIG. 12 in a high ready posture.
Figure 16:
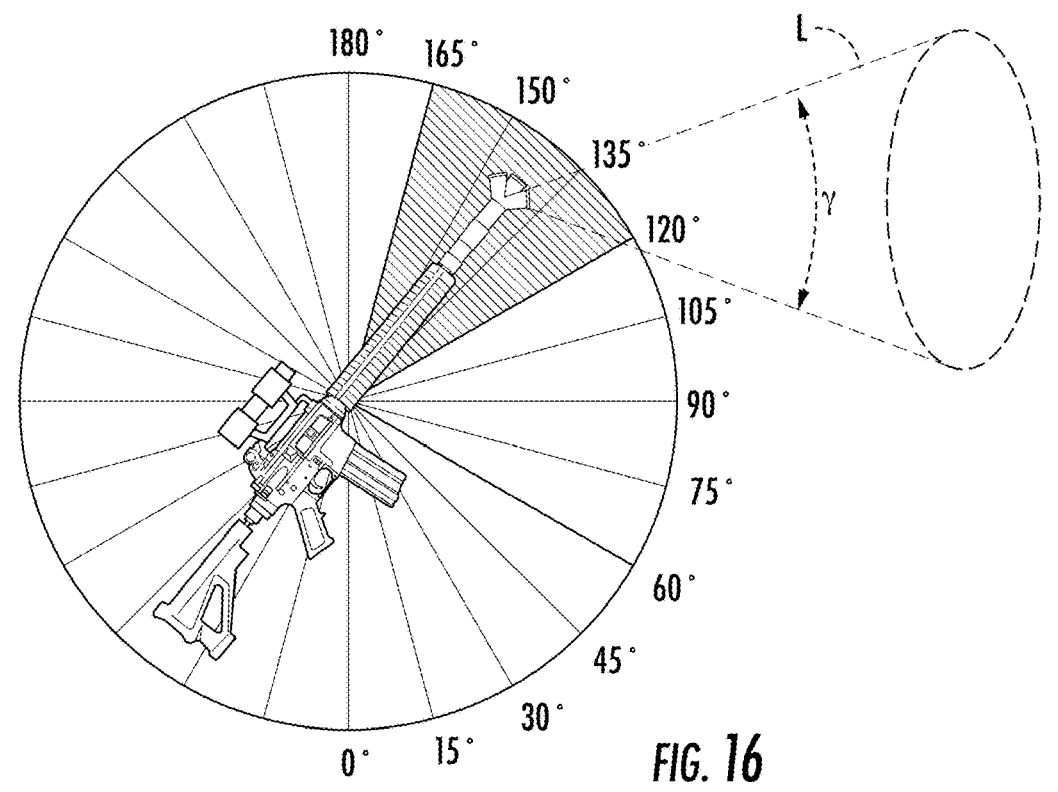
FIG. 16 is a schematic illustration depicting a range of motion for the high ready posture of the weapons system of FIG. 12.

Particularly referring FIGS. 15 and 16, the weapons system 200 is shown in a high ready posture in which the operator is holding the weapons system 200 with the muzzle of the barrel 214 pointed in an upwards direction. The upwards position of the light 100 may correspond to the high ready posture of the weapons system 200. In the high ready posture, the light 100 is in the upwards position with the lower illumination assembly 140 in the on state to illuminate the visual field V of the operator. When the weapons system 200 is in the high ready posture the field of fire F of the weapons system 200 is generally upwards and does not overlap with the visual field V of the operator.

Figure 17:
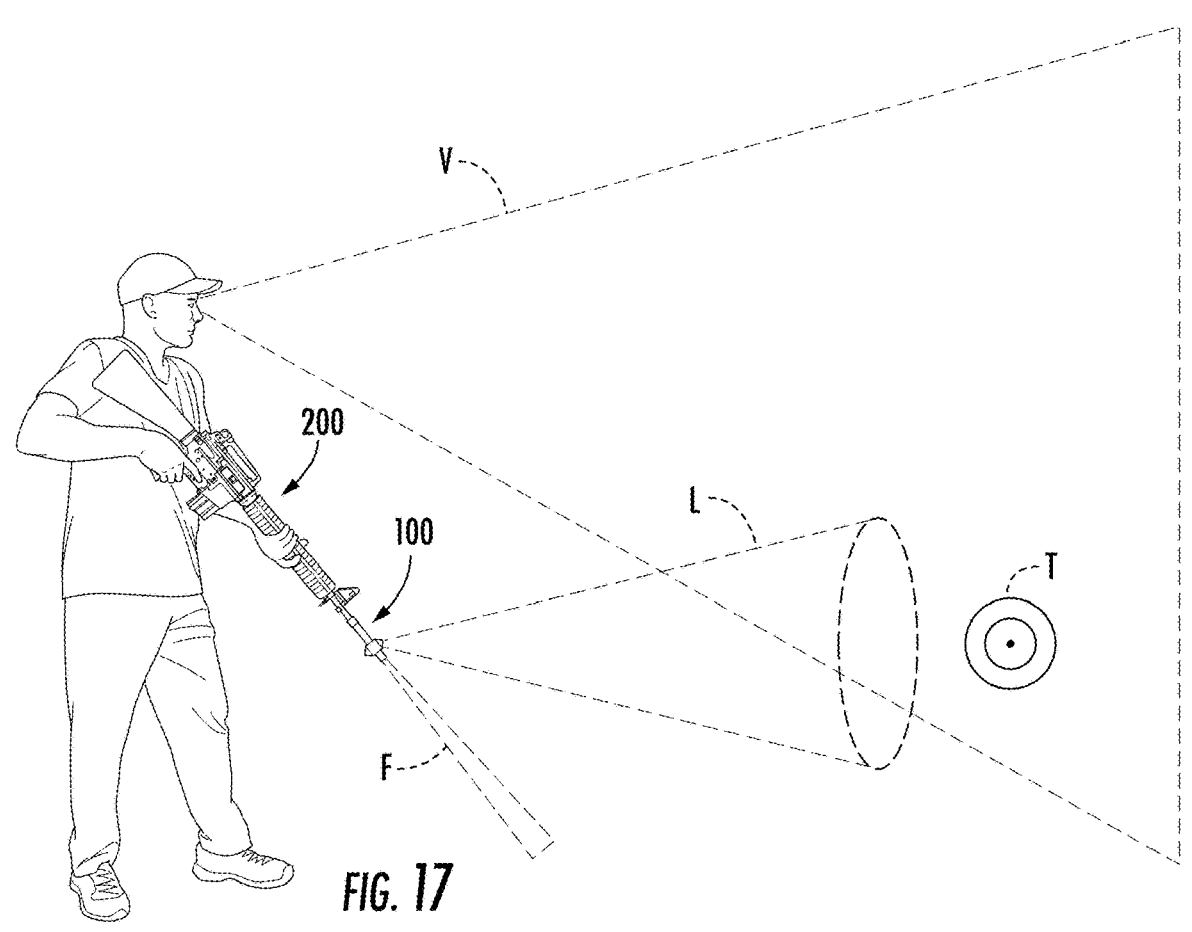
FIG. 17 is a side view of an operator holding the weapons system of FIG. 12 in a low ready posture.
Figure 18:
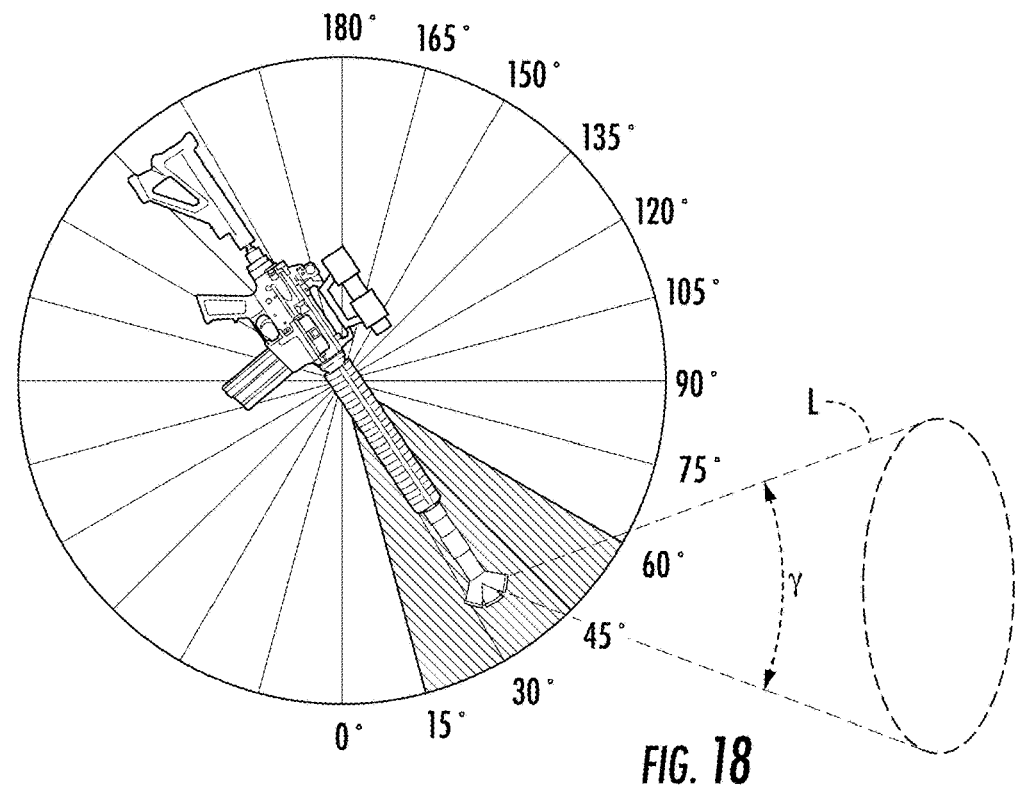
FIG. 18 is a schematic illustration depicting a range of motion for the low ready posture of the weapons system of FIG. 12.

Particularly referring FIGS. 17 and 18, the weapons system 200 is shown in a low ready posture in which the operator is holding the weapons system 200 with the muzzle of the barrel 214 pointed in a downwards direction. The downwards position of the light may correspond to the low ready posture of the weapons system 200. In the low ready posture, the light 100 is in the downwards position with the upper illumination assembly 120 in the on state to illuminate the visual field V of the operator. When the weapons system 200 is in the low ready posture the field of fire F of the weapons system 200 is generally downwards and does not overlap with the visual field V of the operator.

Referring to FIG. 19, the weapons system 200 is shown in a vertical posture in which the operator may be holding the weapons system 200 with the muzzle of the barrel 214 pointed in a vertical direction. The muzzle of the barrel 214 may be pointed in an upwards vertical direction or a downwards vertical direction. In the vertical posture, the light 100 is in the vertical position with all of the illumination assemblies 120, 130, 140 in the off state.

Referring to FIG. 20, the weapons system 200 is shown in a side posture in which the operator may be holding the weapons system 200 rotated about the barrel 214, e.g., a side grip or Center Axis Relock (C.A.R.) grip. In the side posture, the light 100 is in the rolled position with all of the illumination assemblies 120, 130, 140 in the on state. In some embodiments, when the weapons system 200 is in the side posture one or more of the illumination assembly 120, 130, 140 may be in the strobe state. In certain embodiments, when the weapons system 200 is in a first side posture, e.g., rotated counterclockwise, each illumination assembly 120, 130, 140 may be in the on state, and when the weapons system 200 is in a second side posture, e.g., rotated clockwise, each illumination assembly 120, 130, 140 may be in the strobe state. Additionally, the weapons system 200 may concurrently be in one of the high ready posture, the low ready posture, the target engagement posture, or the vertical posture and the side posture. For example, when the weapons system 200 is in the in the target engagement posture, rotating the weapons system 200 counterclockwise may switch each of the illumination assemblies 120, 130, 140 to the on state to illuminate the area in front of the operator. Additionally or alternatively, when the weapons system 200 is in the target engagement posture, rotating the weapons system 200 clockwise may switch each of the illumination assemblies 120, 130, 140 to the strobe state. In some embodiments, when the weapons system 200 is in the vertical posture, rotating the weapons system 200 counterclockwise may switch each of the illumination assemblies 120, 130, 140 to the on state to illuminate the area above the operator. Additionally or alternatively, when the weapons system 200 is in the vertical posture, rotating the weapons system 200 clockwise may switch each of the illumination assemblies 120, 130, 140 to the strobe state. For example, when the weapons system 200 is in both the vertical posture and the side posture the light 100 may be in the strobe state or in a distress state to signal, e.g., flashing S.O.S. in Morse Code, to overhead search and rescue aircraft. Additionally or alternatively, when the light 100 is in the strobe state the light 100 may incapacitate a target. The strobe state may non-lethally incapacitate a target by overloading the visual processing system of the brain, causing temporary blindness, disorientation, or nausea.

Figure 21:
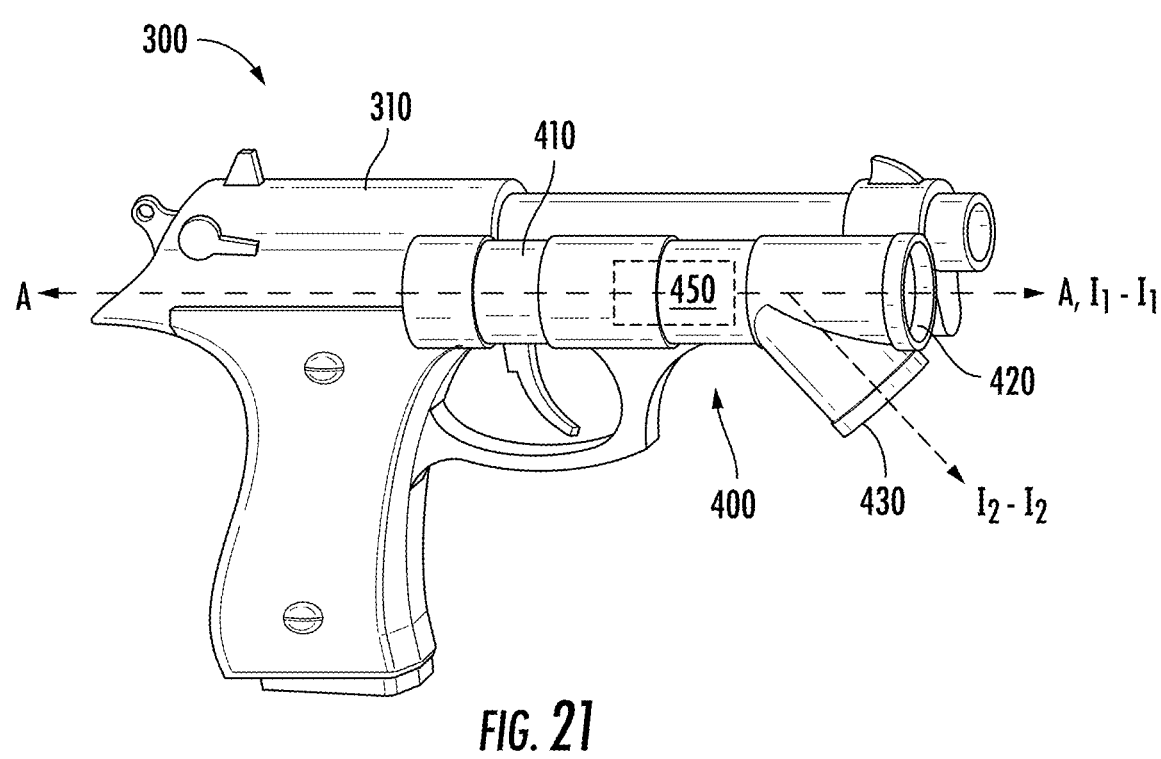
FIG. 21 is a perspective view of another weapons system including another light in a high configuration thereof in accordance with embodiments of the present disclosure.
Figure 22:
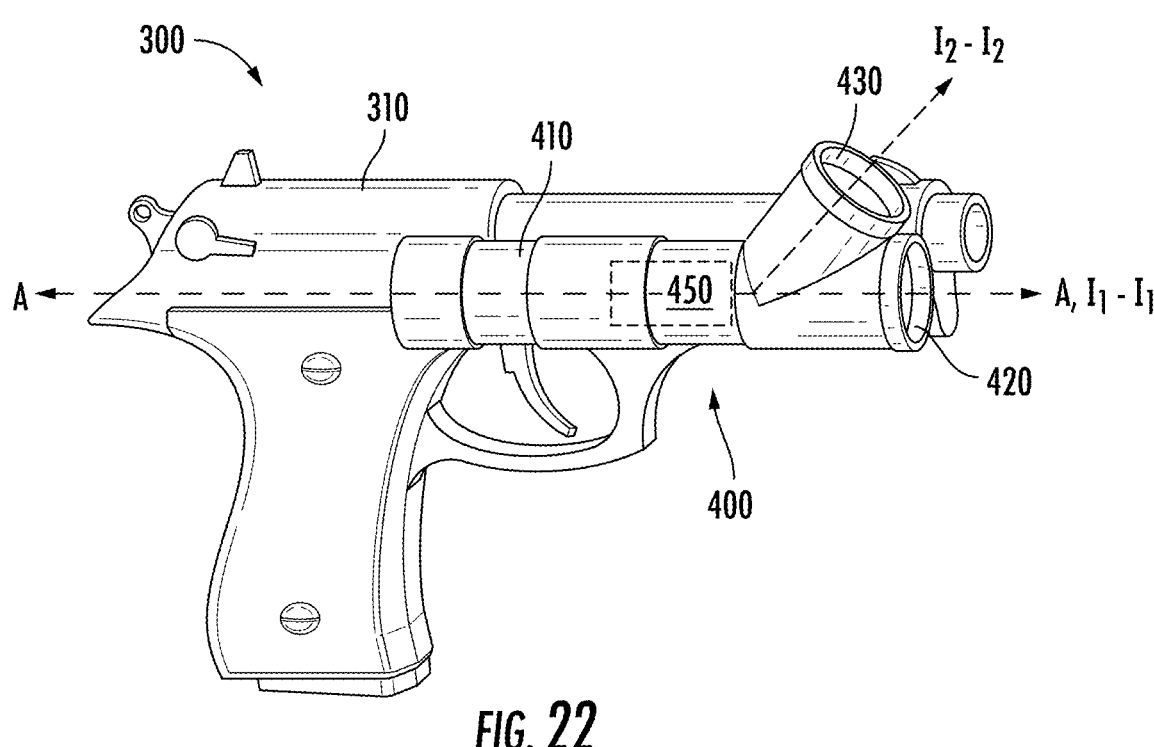
FIG. 22 is a perspective view of the weapons system of FIG. 21 with the light in a low configuration thereof in accordance with embodiment of the present disclosure.

Referring to FIGS. 21 and 22, another weapons system 300 including another light 400 is shown in accordance with embodiments of the present disclosure. The weapons system 300 is substantially similar to the weapons system 200 and only the differences will be described herein for reason of brevity with similar elements given like labels with the leading "2" replaced with a leading "3". The light 400 is substantially similar to the light 100 and only the differences will be described herein for reasons of brevity with similar elements given like labels with the leading "1" replaced with a leading "4".

The light 400 includes a housing 410, a first or primary illumination assembly 420, a second or secondary illumination assembly 430, and a control unit 450. The light 400 is configured to switch each illumination assembly 420, 430 between an on state and an off state based on the position of the light 400 with respect to the force of gravity acting on the light 400. The primary illumination assembly 420 is positioned within the housing 410 with the first center illumination axis $I_1$-$I_1$ thereof parallel or coaxial with the central axis A-A of the light 400. The secondary illumination assembly 430 is positioned in the housing 410 with the second center illumination axis $I_2$-$I_2$ thereof offset at an angle with respect to the central axis A-A in a range of 10 degrees to 70 degrees, e.g., 20 degrees, 45 degrees, or 60 degrees.

The weapons system 300 includes a weapons platform 310 and the light 400. The light 400 is mounted to the weapons platform 310 in a low configuration with the secondary illumination assembly 430 above the primary illumination assembly 420 (FIG. 22) or in a high configuration with the secondary illumination assembly 430 below the primary illumination assembly 420 (FIG. 21). Mounting the light 400 in the low configuration may allow the weapons system 300 to illuminate the field of fire F of the weapons system 300 when carried in the target engagement posture and the visual field V of the operator when carried in the low ready posture. Mounting the light 400 in the high configuration may allow the weapons system 300 to illuminate the field of fire F of the weapons system 300 when carried in the target engagement posture and the visual field V of the operator when carried in the high ready posture. The light 400 may be reconfigured from the high configuration to the low configuration, or vice versa, by rolling the light 180 degrees about the central axis A-A. In embodiments, the light 400 may be reconfigured without unmounting the light 400 from the weapons platform 310. For example, the when the light 400 is rolled about the central axis A-A, the control unit 450 may automatically detect the configuration of the light 400.

Figure 23:
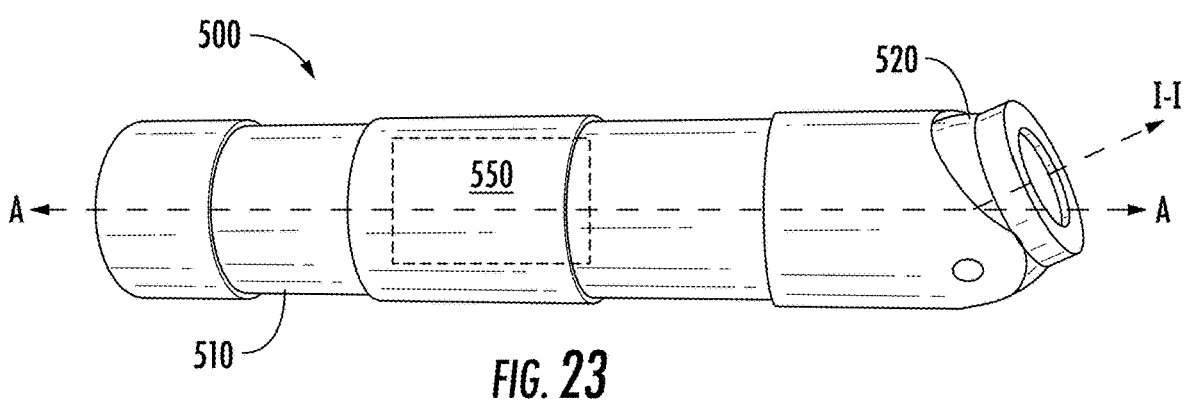
FIG. 23 is a perspective view of another light in accordance with embodiments of the present disclosure.
Figure 24A:
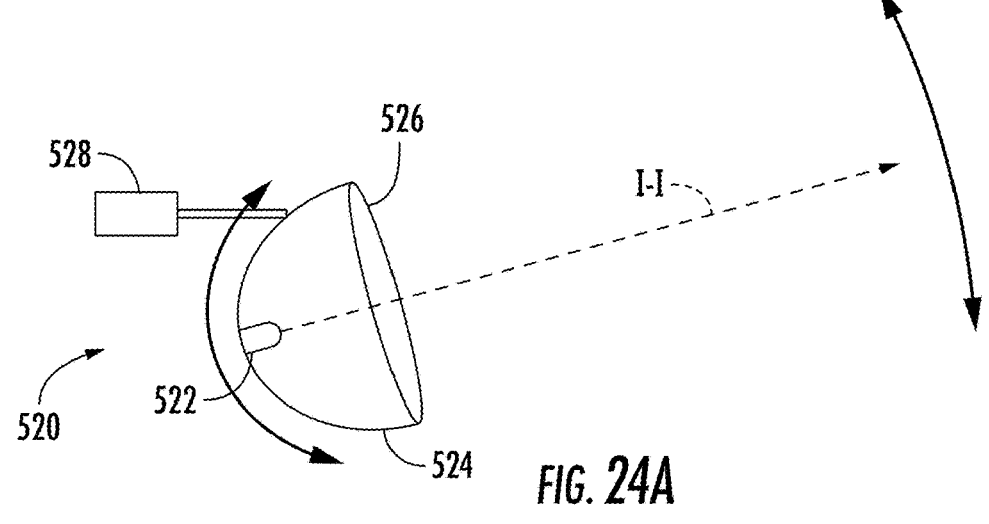
FIG. 24A is side view of an illumination assembly of the light of FIG. 23.
Figure 24B:
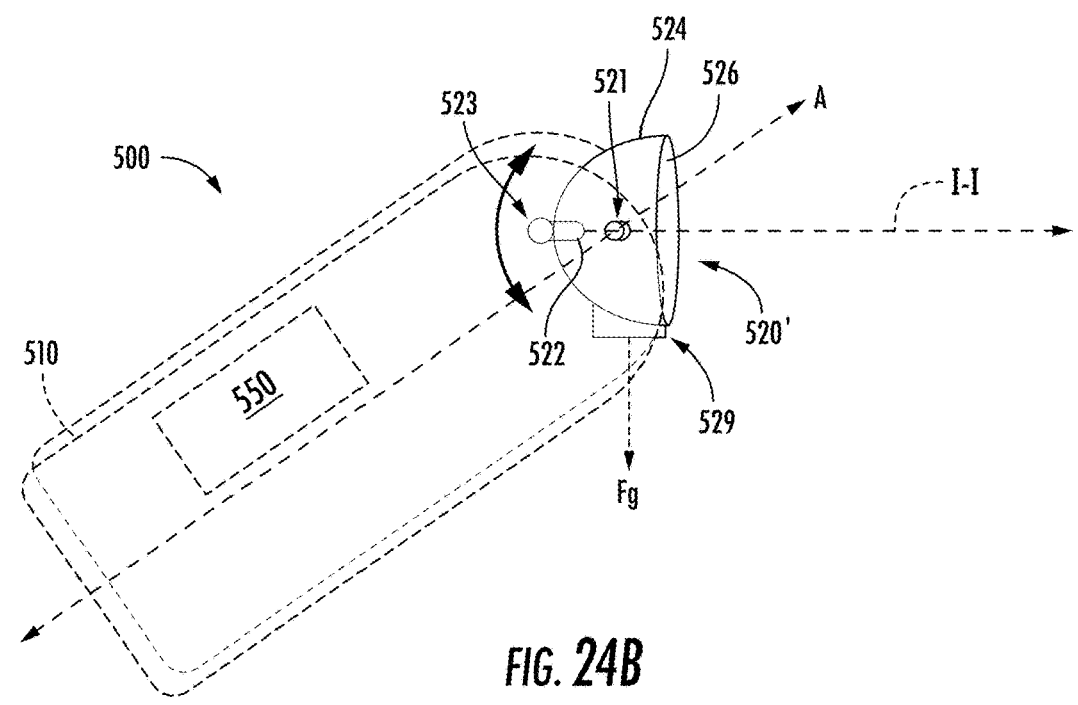
FIG. 24B is a side view of another illumination assembly of the light of FIG. 23.

Referring now to FIGS. 23, 24A, and 24B, another light 500 in accordance with embodiments of the present disclosure is shown. The light 500 is substantially similar to the light 100 and only the differences will be described herein with similar elements given like labels for reasons of brevity with the leading "1" replaced with a leading "5".

The light 500 includes a housing 510, an illumination assembly 520 and a control unit 550. The light 500 is configured to pivot the illumination assembly 520 based on the position of the light 500 with respect to the force of gravity acting on the light 500 to maintain constant illumination of the visual field V of the operator.

The illumination assembly 520 includes an illumination element 522, a reflector 524, a lens 526, and an actuator 528. The actuator 528 is configured to pivot the illumination element 522, the reflector 524, and the lens 526 upwards or downwards with respect to the central axis A-A of the light 500 based on the position of the light 500. Pitching of the illumination element 522, the reflector 524, and the lens 526 by the actuator 528 may maintain the center illumination axis I-I of the light 500 in a constant direction. Accordingly, the light 500 may illuminate the visual field V of the operator when the housing 510 is in the primary, the upwards, or the downwards position.

With particular reference to FIG. 24B, another illumination assembly 520' in accordance with embodiments of the present disclosure is shown. The illumination assembly 520' is substantially similar to the illumination assembly 520 but replaces the actuator 528 with a counterweight 529 to pivot the illumination element 522, the reflector 524, and the lens 526 upwards or downwards with respect to the central axis A-A of the light 500 based on the position of the light 500. For example, when the light 500 is moved toward the upwards position, the counterweight 529 causes the illumination element 522, the reflector 524, and the lens 526 to pivot about the pivot point 521 to maintain the center illumination axis I-I in a constant direction. In some embodiments, the illumination assembly 520' may include a magnet 523 attached to the rear side of the reflector 524. The magnet 523 may control the speed that the illumination assembly 520' moves when the light 500 is moved. For example, the magnet 523 may control the speed the illumination assembly 520' pivots about the pivot point 521 by eddy current damping. Specifically, the magnet 523 may generate eddy currents against the housing 510 due to pivoting of the illumination assembly 520' relative to the housing 510. The eddy current damping may allow for the illumination assembly 520' to pivot at a substantially constant rate.

Figure 25:
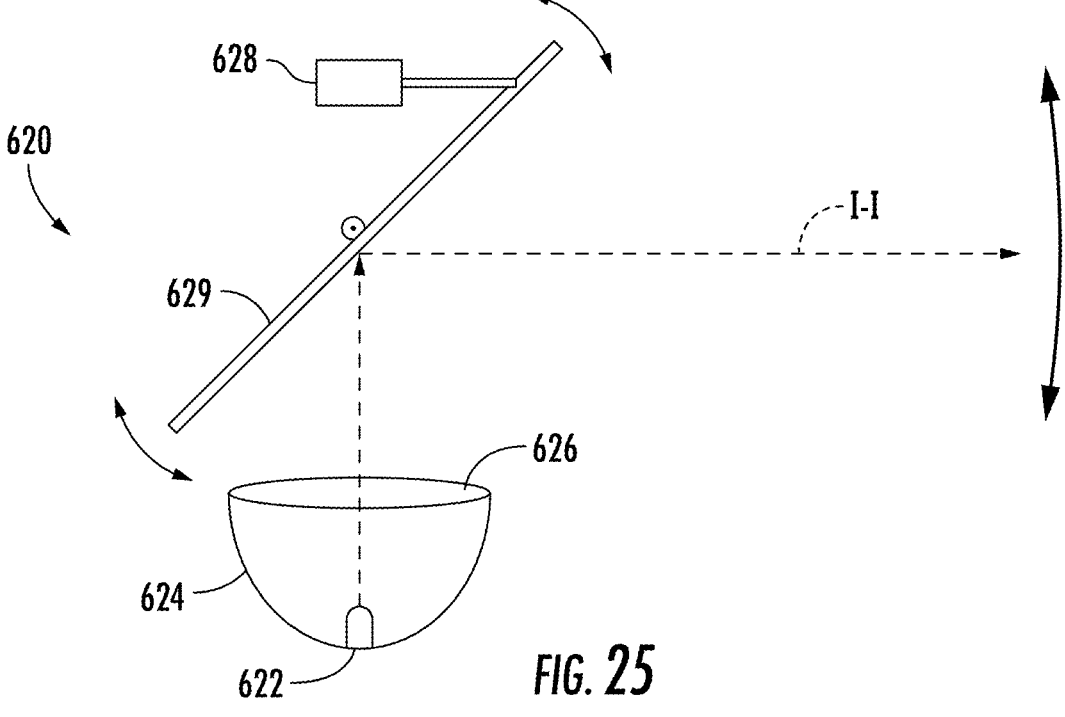
FIG. 25 is a side view of another illumination assembly of the light of FIG. 23.

Referring now to FIGS. 23 and 25, another illumination assembly 620 in accordance with embodiments of the present disclosure is shown. The illumination assembly 620 is substantially similar to illumination assembly 520 of light 500 and only the differences will be described herein with similar elements given like labels for reasons of brevity with the leading "5" replaced with a leading "6".

The light 500 may include the illumination assembly 620 in the place of the illumination assembly 520. The illumination assembly 620 includes an illumination element 622, a reflector 624, a lens 626, an actuator 628, and a mirror 629. The actuator 628 is configured to pivot the mirror 629 upwards or downwards with respect to the illumination element 622 and the reflector 624 based on the position of the light 600. Pivoting of the mirror 629 by the actuator 628 may maintain the center illumination axis I-I of the light 600 in constant direction. Accordingly, the light 500 may illuminate the visual field V of the operator when the housing 610 is in the primary, the upwards, or the downwards position. In certain embodiments, the illumination assembly 620 may include more than one mirror 629 and more than one actuator 628. In such an embodiment, the mirrors 629 may be independently actuated by a respective actuator 628.

Figure 26:
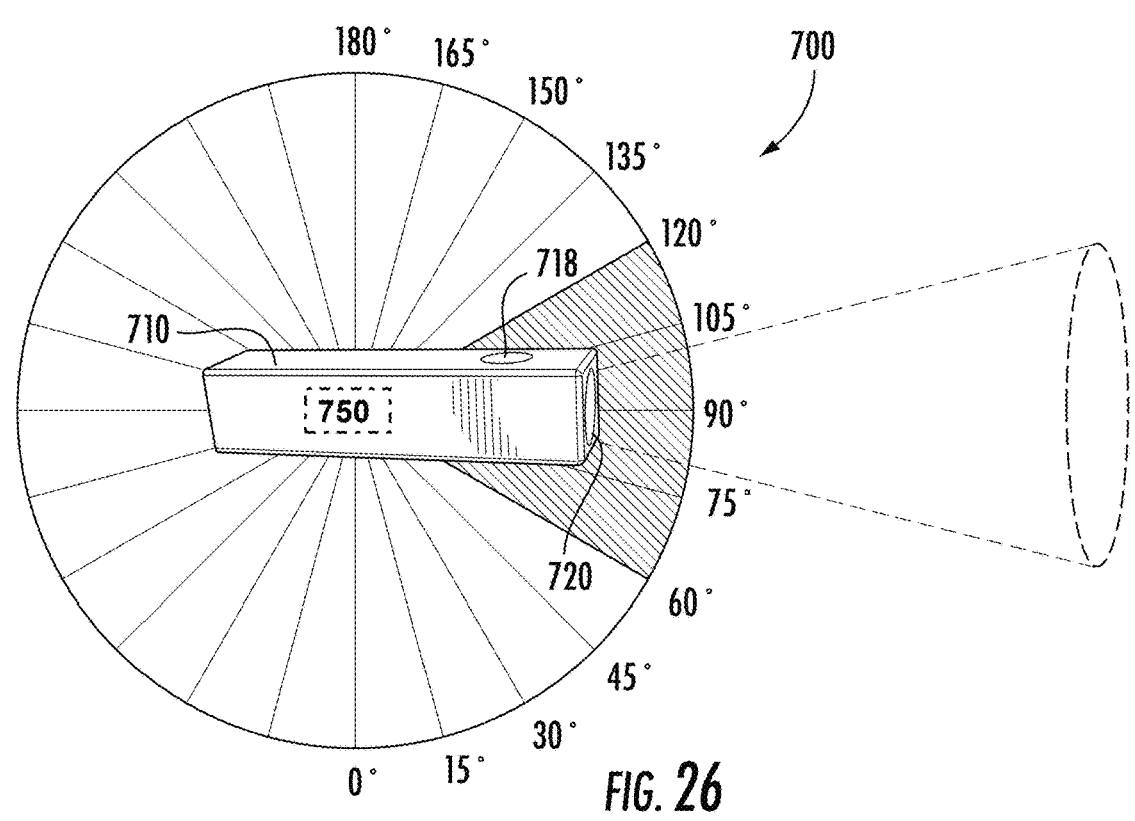
FIG. 26 is a schematic illustration depicting another light and a range of motion for a primary position thereof in accordance with embodiments of the present disclosure.
Figure 27:
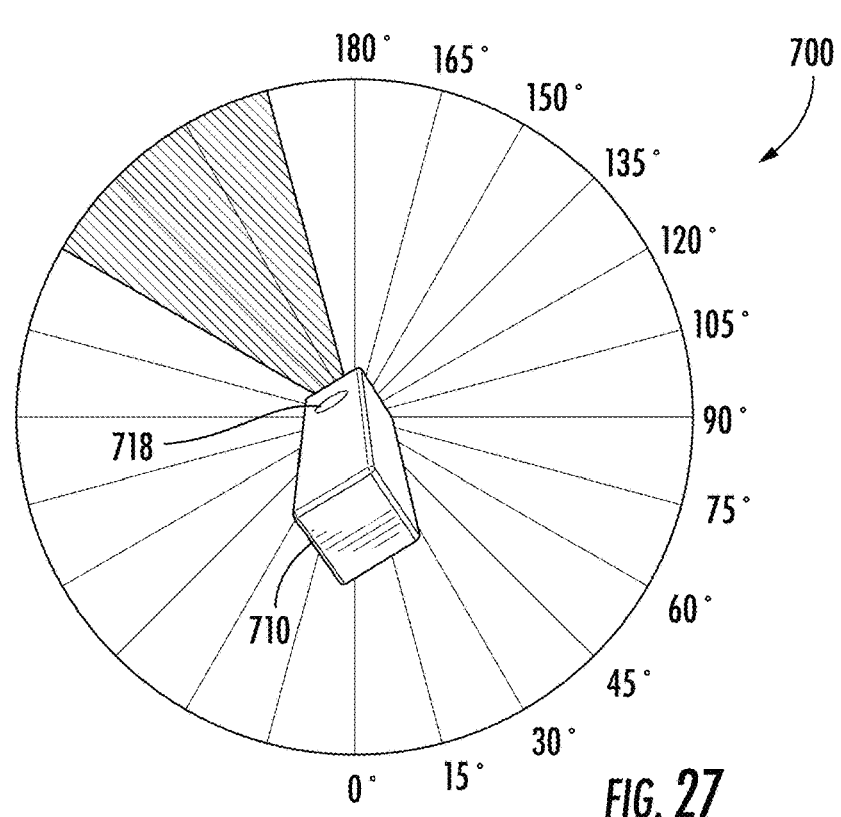
FIG. 27 is a schematic illustration depicting the light of FIG. 26 and a range of motion for a rolled position thereof in accordance with embodiments of the present disclosure.

Referring now to FIGS. 26 and 27, another light 700 in accordance with embodiments of the present disclosure is shown. The light 700 is substantially similar to the light 100 and only the differences will be described herein with similar elements given like labels for reasons of brevity with the leading "1" replaced with a leading "7".

The light 700 includes a housing 710, an illumination assembly 720 and a control unit 750. The light 700 is configured to switch the illumination assembly 720 between the on state and the off state based on the position of the light 700 with respect to the force of gravity acting on the light 700. The housing 710 may be sized and dimensioned for any desired application. For example, the housing 710 may be sized and dimensioned for use in a manner similar to a conventional handheld flashlight. In such an embodiment, the housing 710 may be formed as an elongate body with a cylindrical, square, or other polygonal profile. In certain embodiments, the housing 710 is sized and dimensioned as a head light for hands-free use by an operator. The housing 710 has a mode control 718 for selecting the state of the light 700. Additionally or alternatively, in some embodiments, moving the light 700 between positions may alter properties of the light beam emitted by the illumination assemblies 720 including, but not limited to, brightness, color, beam angle, or combinations thereof as described below.

For example, when the light 700 is the primary position the beam angle γ may be in a range of 5 degrees to 25 degrees, e.g., 15 degrees. When the light 700 is in the upwards position or the downwards position the beam angle γ may be in a range of 30 degrees to 60 degrees, e.g., 45 degrees. Additionally or alternatively, when the light 700 is the primary position the beam brightness may be in a range of 1000 lumens to 1500 lumens, e.g., 1200 lumens. When the light 700 is in the upwards position or the downwards position the beam brightness may be in a range of 200 lumens to 800 lumens, e.g., 500 lumens. In some embodiments, when the light 700 is in the primary position the beam color may be a white light. When the light 700 is in the upwards position or the downwards position the beam color may be a red light. In such embodiments, the beam color being red in the upwards position or the downwards position may minimally affect the night vision of the operator.

A method of controlling a light in accordance with embodiments of the present disclosure is described with reference to the light 100 of FIG. 1-11 and the weapons system 200 of FIGS. 12-20. The light 100 may be turned to the on mode by actuating the mode control 118. When the light 100 is turned to the on mode one or more of the illumination assemblies 120, 130, 140 may switch to the on state. For example, the primary illumination assembly 130 may, by default, switch to the on state regardless of the position of the light 100. The primary illumination assembly 130 may remain in the on state regardless of position of the light 100 for an initial start-up duration. The start-up duration may be in a range of 1 second to 15 seconds, e.g., 3 seconds or 5 seconds.

The light 100 is controlled by detecting the position of the light 100 with respect to the direction of the force of gravity. Specifically, the sensor 160 detects the pitch of the central axis A-A of the light 100 with respect to the force of gravity. The control unit 150 may switch illumination assemblies 120, 130, 140 between on states and off states based on the pitch of the central axis A-A detected by the sensor 160. In some embodiments, the sensor 160 detects movement of the central axis A-A from a first pitch to a second pitch. Detecting movement of the light 100 may reduce lag in detecting the position of the light 100. The control unit 150 may begin controlling the illumination assemblies 120, 130, 140 based on the position of the light 100 after the start-up duration.

Based on the position of the light 100 detected by the sensor 160, the control unit 150 switches the illumination assemblies 120, 130, 140 to the on state or the off state. For example, when sensor 160 detects the light 100 is in the primary position the control unit 150 may switch the primary illumination assembly 130 to the on state. In the upwards position, the control unit 150 may switch the lower illumination assembly 140 to the on state. When sensor 160 detects the light 100 is in the downwards position the control unit 150 may switch the upper illumination assembly 120 to the on state. The light 100 may be in the rolled position and the control unit 150 may switch each of the illumination assemblies 120, 130, 140 to the on state or to the strobe state. When sensor 160 detects the light 100 is in the vertical position the control unit 150 may switch each of the illumination assemblies 120, 130, 140 to the off state.

The light 100 may be moved between positions directly. For example, an operator may hold the light in hand and move the light 100 between positions. In some embodiments, the light 100 may be attached to the weapons system 200 and moved between positions by movement of the weapons system 200 between postures. Accordingly, the method may be performed with the weapons system 200. For example, an operator may hold the weapons system 200 in a high ready posture or a low ready posture to illuminate the visual field V of the operator. The control unit 150 detects the position of the light 100 and the corresponding posture of the weapons system 200 and switches a respective illumination assembly 120, 130, 140 to the on state to illuminate the visual field V of the operator. For example, when the weapons system 200 is in the high ready posture the lower illumination assembly 140 may be in the on state and when the weapons system 200 is in the low ready posture the upper illumination assembly 120 may be in the on state. Holding the weapons system 200 in the high ready posture or the low ready posture may allow the operator to safely maneuver the weapons system 200 in low light environments. Conventional lights for weapons platforms may only illuminate the visual field V of the operator when held in the target engagement posture. This limitation presents dangers to other persons in the vicinity of the operator and the operator themselves. The light 100 overcomes the limitations and shortcomings of conventional lights by illuminating the visual field V of the operator when the weapons system 200 is held in the generally safe high ready and low ready postures with the field of fire F directed towards the sky or towards the ground.

The operator may move the weapons system 200 to the target engagement posture to maintain illumination of the visual field V and to illuminate the field of fire F of the weapons system 200. The light 100 detects the change in posture of the weapons system 200 and switches the primary illumination assembly 130 to the on state to illuminate both the visual field V of the operator and the field of fire F of the weapons system 200. The operator may return the weapons system 200 to the high ready posture or the low ready posture.

In some embodiments, when the operator moves weapons system 200 to the target engagement posture, one or more of the illumination assemblies 120, 130, 140 may be switched to the on state and be locked in the on state to allow the operator to track the target T. For example, when the operator moves the weapons system 200 from the low ready posture to the target engagement posture, the primary illumination assembly 130 may switch to the on state and be locked in the on state to allow the operator to track the target T. In such embodiments, the primary illumination assembly 130 may remain locked in the on state until the operator unlocks the primary illumination assembly 130. For example, the operator may unlock the primary illumination assembly 130 by actuating the mode control 118 or the remote selector 216. Locking the primary illumination assembly 130 in the on state when the weapons system 200 is moved to the target engagement posture may allow the operator to track the target T as the target T moves without consideration to operation of the light 100. This may allow the operator to fully focus on safely maneuvering the weapons system 200 and appropriately addressing the target T. In certain embodiments, the upper illumination assembly 120 or the lower illumination assembly 140 may be locked in the on state. In some embodiments, all of the illumination assemblies 120, 130, 140 may be locked in the on state.

The operator may move the weapons system 200 to a vertical posture to switch all of the illumination assemblies 120, 130, 140 to the off state. The vertical posture may be considered a relaxed posture in which operator is hands free from the weapons system 200. For example, when the weapons system 200 is hanging on a sling the weapons system 200 may be in the vertical posture with all of the illumination assemblies 120, 130, 140 in the off state.

The operator may move the weapons system 200 to a side posture to switch all of the illumination assemblies 120, 130, 140 to the on state or to the strobe state. The operator may move the weapons system 200 to a first side posture by rolling the weapons system 200 clockwise to switch all the illumination assemblies 120, 130, 140 to the on state to illuminate a greater area. The operator may move the weapons system 200 to a second side posture by rolling the weapons system 200 counterclockwise to switch all the illumination assemblies 120, 130, 140 to the strobe state to incapacitate a target or to signal to other nearby persons. The weapons system 200 may be in a side posture and any of the high ready posture, the low ready posture, the target engagement posture, or the vertical posture. For example, the weapons system 200 may be in the first side posture and the target engagement posture to illuminate a wide visual field V of the operator. In another embodiment, the weapons system 200 may be in an upwards vertical posture and the second side posture to flash "S.O.S." in Morse Code to signal overhead aircraft.

Additionally or alternatively, in some embodiments, moving the weapons system 200 between positions may alter properties of the light beam emitted by the illumination assemblies 120, 130, 140 including, but not limited to, brightness, color, beam angle, or combinations thereof. For example, when the weapons system 200 is the primary position the beam angle $\gamma$ emitted by the primary illumination assembly 130 may be in a range of 5 degrees to 25 degrees, e.g., 15 degrees. When the weapons system 200 is in the upwards position or the downwards position the beam angle $\gamma$ emitted by the upper illumination assembly 120 or the lower illumination assembly 140 may be in a range of 30 degrees to 60 degrees, e.g., 45 degrees. Additionally or alternatively, when the weapons system 200 is the primary position the beam brightness emitted by the primary illumination assembly 130 may be in a range of 1000 lumens to 1500 lumens, e.g., 1200 lumens. When weapons system 200 is in the upwards position or the downwards position the beam brightness emitted by the upper and lower illumination assemblies 120, 140 may be in a range of 200 lumens to 800 lumens, e.g., 500 lumens. In some embodiments, when the weapons system 200 is in the primary position the beam color may be a white light. When the weapons system 200 is in the upwards position or the downwards position the beam color may be a red light. In such embodiments, the beam color being red in the upwards position or the downwards position may minimally affect the night vision of the operator.

Although the method steps are described in a specific order, it should be understood that other steps may be performed in between described steps, described steps may be adjusted so that they occur at slightly different times, or the described steps may occur in any order unless otherwise specified.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A light comprising:
   a housing defining a central axis, the housing configured to mount to a weapons platform;
   a first illumination assembly disposed within the housing, the first illumination assembly having an on state in which the first illumination assembly emits a light beam and an off state, the first illumination assembly defining a first center illumination axis that is parallel with the central axis of the housing;
   a second illumination assembly disposed within the housing, the second illumination assembly having an on state in which the second illumination assembly emits a light beam and an off state, the second illumination assembly defining a second center illumination axis that is offset from the central axis of the housing; and a control unit disposed within the housing, the control unit configured to detect a first pitch of the central axis with respect to a direction of the force of gravity and to detect a second pitch of the central axis with respect to the direction of the force of gravity, the control unit in signal communication with the first illumination assembly such that in the first pitch the first illumination assembly is in the on state and the second illumination assembly is in the off state, the control unit in signal communication with the second illumination assembly such that in the second pitch the second illumination assembly is in the on state and the first illumination assembly is in the off state, the first illumination assembly configured to illuminate a visual field of an operator in the first pitch and the second illumination assembly configured to illuminate the visual field of the operator in the second pitch.

2. The light according to claim 1, wherein the housing includes a third illumination assembly having an on state in which the third illumination assembly emits a light beam and an off state, the third illumination assembly defining a third center illumination axis that is offset from the central axis of the housing.

3. The light according to claim 2, wherein the first illumination assembly, the second illumination assembly, and the third illumination assembly are disposed within the housing such that the first center illumination axis, the second center illumination axis, and the third center illumination axis are coplanar.

4. The light according to claim 1, wherein the control unit includes a sensor, the sensor including an inclinometer configured to detect a pitch of the central axis of the housing with respect to the direction of the force of gravity.

5. The light according to claim 4, wherein the sensor includes an accelerometer configured to detect movement of the central axis.

6. The light according to claim 1, wherein the control unit includes a sensor, the sensor including a three-axis gyroscope configured to detect a pitch of the central axis of the housing with respect to the direction of the force of gravity.

7. The light according to claim 1, wherein the control unit is configured to detect radial movement of the light about the central axis, the control unit is in signal communication with the first illumination assembly and the second illumination assembly such that when the control unit detects that the light is rolled a first direction about the central axis the first illumination assembly and the second illumination assembly are in the on state.

8. The light according to claim 7, wherein the control unit is in signal communication with the first illumination assembly and the second illumination assembly such that when the control unit detects that the light is rolled a second direction, opposite the first direction, about the central axis the first illumination assembly and the second illumination assembly are in a strobe state in which the first illumination assembly and the second illumination assembly emit a flashing light.

9. The light according to claim 1, wherein the light beam emitted by the first illumination assembly has a different brightness than the light beam emitted by the second illumination assembly.

10. The light according to claim 1, wherein the control unit is configured to alter properties of the light beam emitted from the first illumination assembly or the second illumination assembly in response to movement of the housing, the properties of the light beam include beam brightness, beam angle, beam color, or combinations thereof.

11. The light according to claim 1, wherein the first pitch is in a range of 60 degrees to 120 degrees.

12. The light according to claim 1, wherein the second pitch is in a range of 120 degrees to 165 degrees or in a range between 15 degrees to 60 degrees.

13. A weapons system comprising:

a weapons platform defining an aiming axis; and a light mounted to the weapons platform, the light comprising:

a first illumination assembly having an on state in which the first illumination assembly emits a light beam and an off state, the first illumination assembly defining a first center illumination axis that is parallel to the aiming axis of the weapons platform;

a second illumination assembly having an on state in which the second illumination assembly emits a light beam and an off state, the second illumination assembly defining a second center illumination axis that is angled with respect to the aiming axis of the weapons platform; and a control unit configured to detect a position of the light that corresponds to a posture of the weapons system with respect to a direction of the force of gravity, the control unit in signal communication with the first illumination assembly such that when the aiming axis is at a first pitch with respect to the direction of the force of gravity the weapons system is in a target engagement posture and the first illumination assembly is in the on state, the control unit in signal communication with the second illumination assembly such that when the aiming axis is at a second pitch with respect to the direction of the force of gravity the weapons system is in a high ready posture or a low ready posture and the second illumination assembly is in the on state.

14. The weapons platform according to claim 13, wherein the light is configured to illuminate a visual field of an operator of the weapons platform in each posture.

15. The weapons system according to claim 13, wherein the light includes a third illumination assembly having an on state in which the third illumination assembly emits a light beam and an off state, the third illumination assembly defining a third center illumination axis that is angled with respect to the aiming axis of the weapons platform, the control unit in signal communication with the third illumination assembly such that when the aiming axis is at a third pitch with respect to the direction of the force of gravity the weapons system is in the other of the high ready posture or the low ready posture and the third illumination assembly is in the on state.

16. The weapons system according to claim 15, wherein the control unit is configured to detect radial movement of the weapons system about the aiming axis, the control unit is in signal communication with the first illumination assembly, the second illumination assembly, and the third illumination assembly such that when the control unit detects that the weapons system is rolled a first direction about the aiming axis the first illumination assembly, the second illumination assembly, and the third are in the on state; and wherein the control unit is in signal communication with the first illumination assembly, the second illumination assembly, and the third illumination assembly such that when the control unit detects that the weapons system is rolled a second direction, opposite the first direction, about the aiming axis the first illumination assembly, the second illumination assembly, and the third illumination assembly are in a strobe state in which the first illumination assembly, the second illumination assembly, and the third illumination assembly emit a flashing light.

17. The weapons system according to claim 15, wherein the first pitch is in a range of 60 degrees to 120 degrees, the second pitch is in a range of 120 degrees to 165 degrees, and the third pitch in a range of 15 degrees to 60 degrees.

18. The weapons system according to claim 15, wherein the weapons system has a vertical posture in which the aiming axis of the weapons platform is substantially parallel to the direction of the force of gravity, when the weapons system is in the vertical posture the first illumination assembly, the second illumination assembly, and the third illumination assembly are in the off state.

19. A light comprising:
a housing defining a central axis;
a first illumination assembly disposed within the housing, the first illumination assembly having an on state in which the first illumination assembly emits a light beam and an off state, the first illumination assembly defining a first center illumination axis that is parallel with the central axis of the housing;
a second illumination assembly disposed within the housing, the second illumination assembly having an on state in which the second illumination assembly emits a light beam and an off state, the second illumination assembly defining a second center illumination axis that is offset from the central axis of the housing; and
a control unit disposed within the housing, the control unit configured to detect a first pitch of the central axis with respect to a direction of the force of gravity and to detect a second pitch of the central axis with respect to the direction of the force of gravity, the control unit in signal communication with the first illumination assembly such that in the first pitch the first illumination assembly is in the on state, the control unit in signal communication with the second illumination assembly such that in the second pitch the second illumination assembly is in the on state, the first illumination assembly configured to illuminate a target in the first pitch and the second illumination assembly configured to illuminate the target in the second pitch.

\* \* \* \* \*